Figure 1:
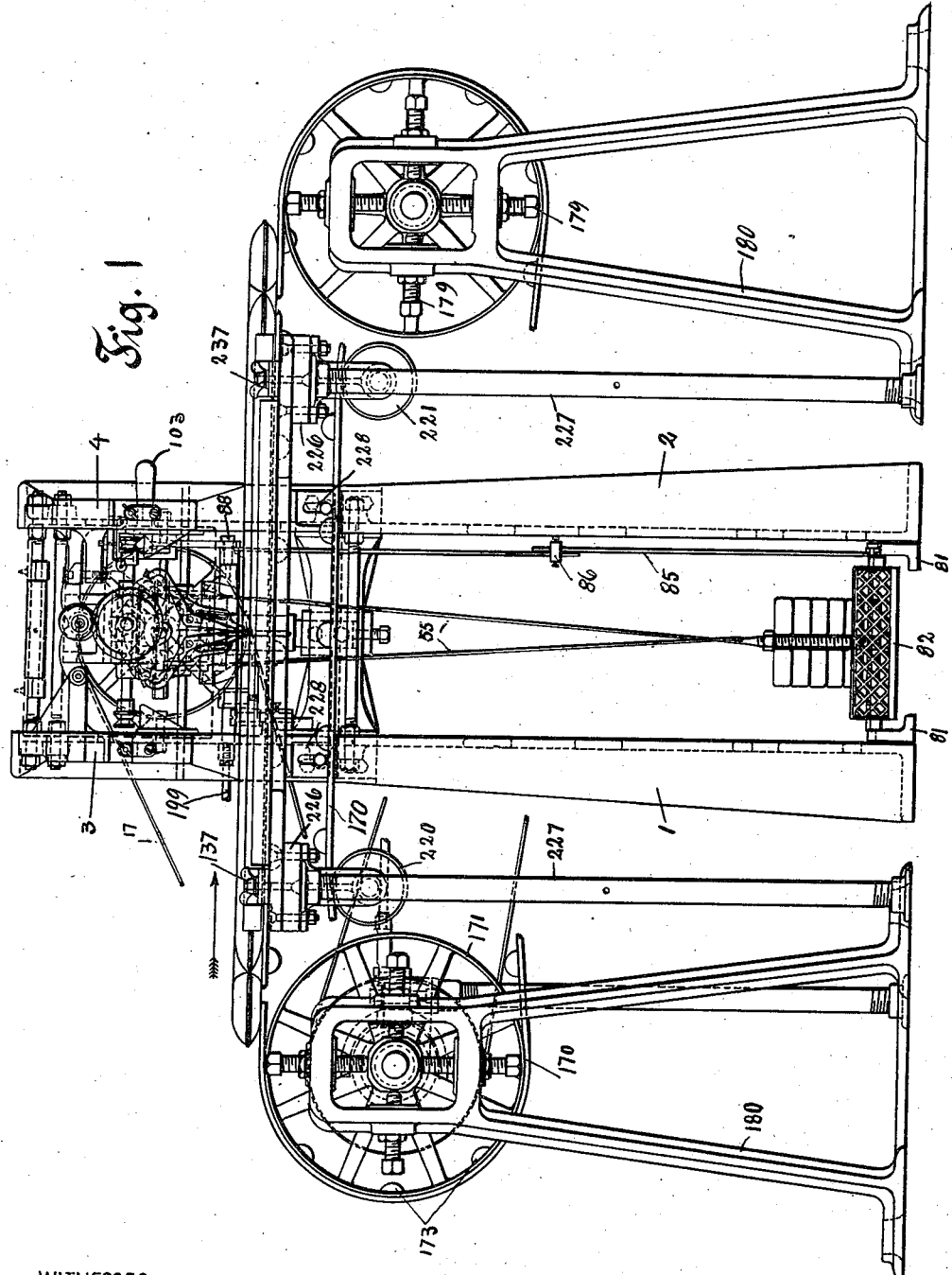

J. P. WEIS.
PAD SEWING MACHINE.
APPLICATION FILED SEPT. 22, 1910.

1,012,775.

Patented Dec. 26, 1911.
10 SHEETS—SHEET 2.

WITNESSES:

INVENTOR
John P. Weis
BY
ATTORNEY

J. P. WEIS.
PAD SEWING MACHINE.
APPLICATION FILED SEPT. 22, 1910.

1,012,775.

Patented Dec. 26, 1911.
10 SHEETS—SHEET 3.

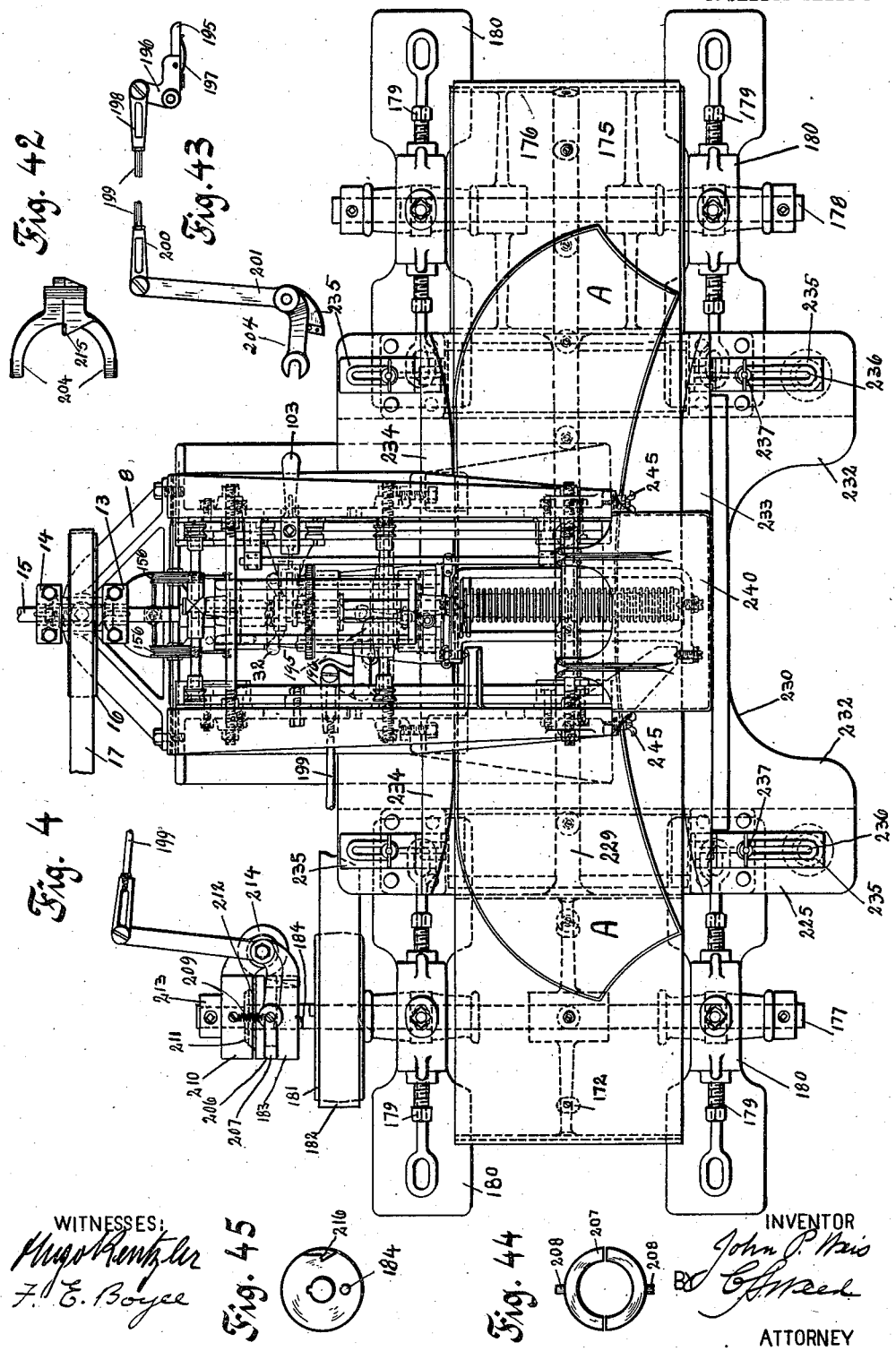

J. P. WEIS.
PAD SEWING MACHINE.
APPLICATION FILED SEPT. 22, 1910.
1,012,775.
Patented Dec. 26, 1911.
10 SHEETS—SHEET 5.
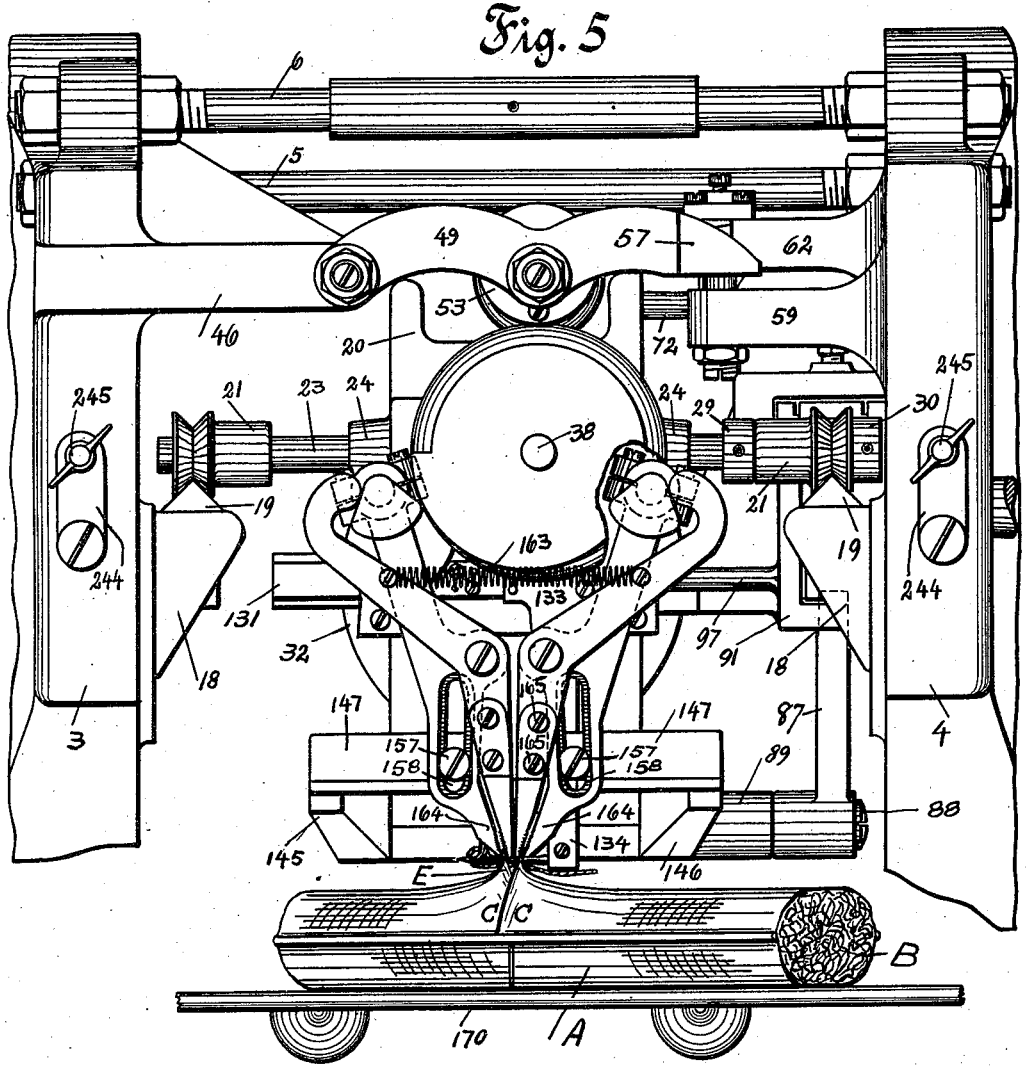
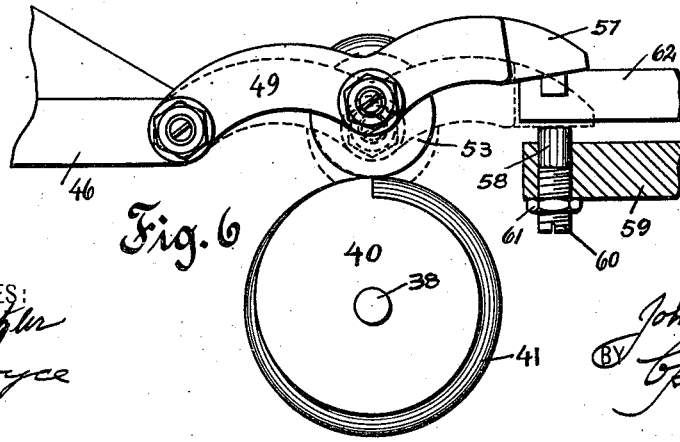
WITNESSES:
INVENTOR
John P. Weis
BY
ATTORNEY

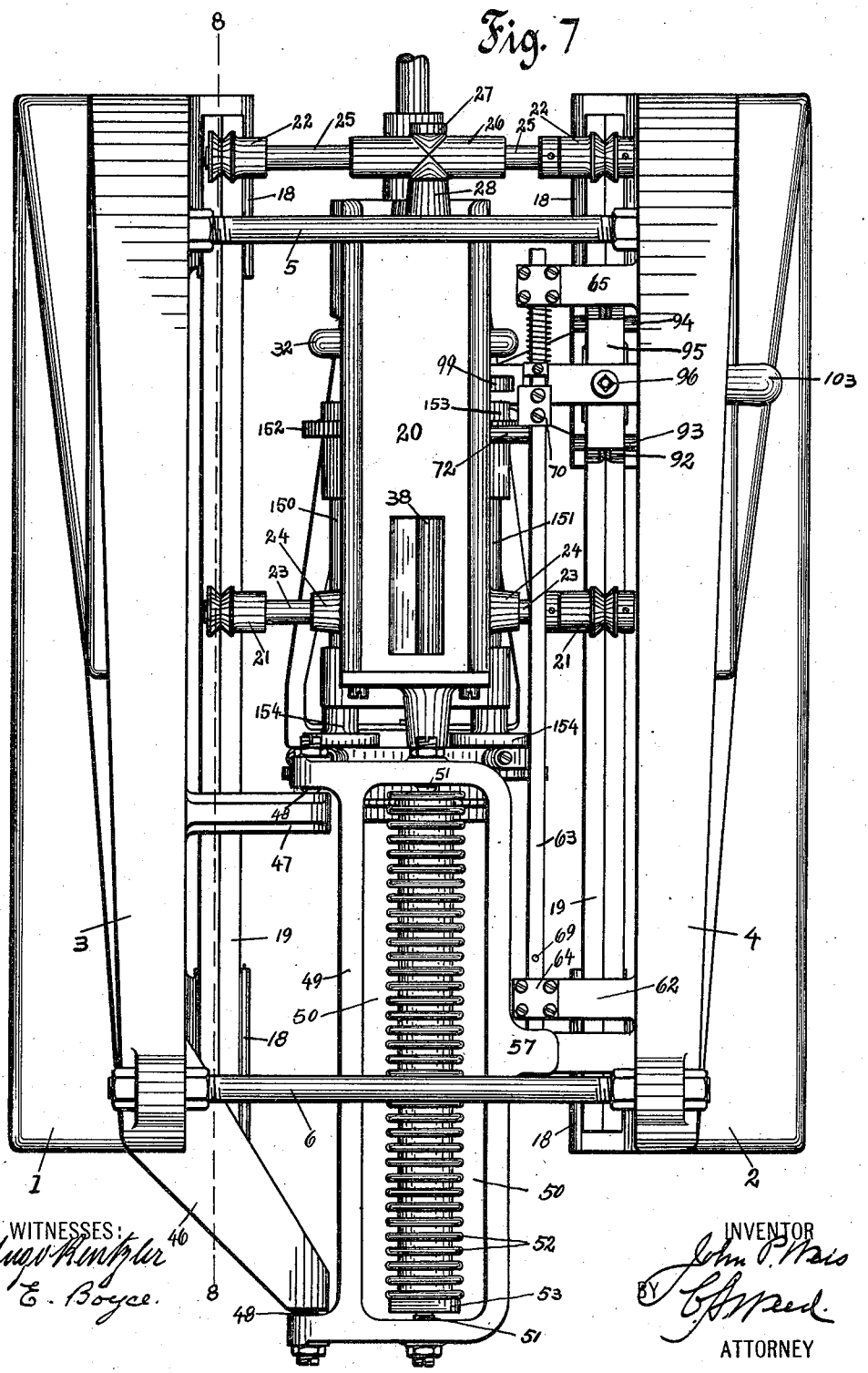

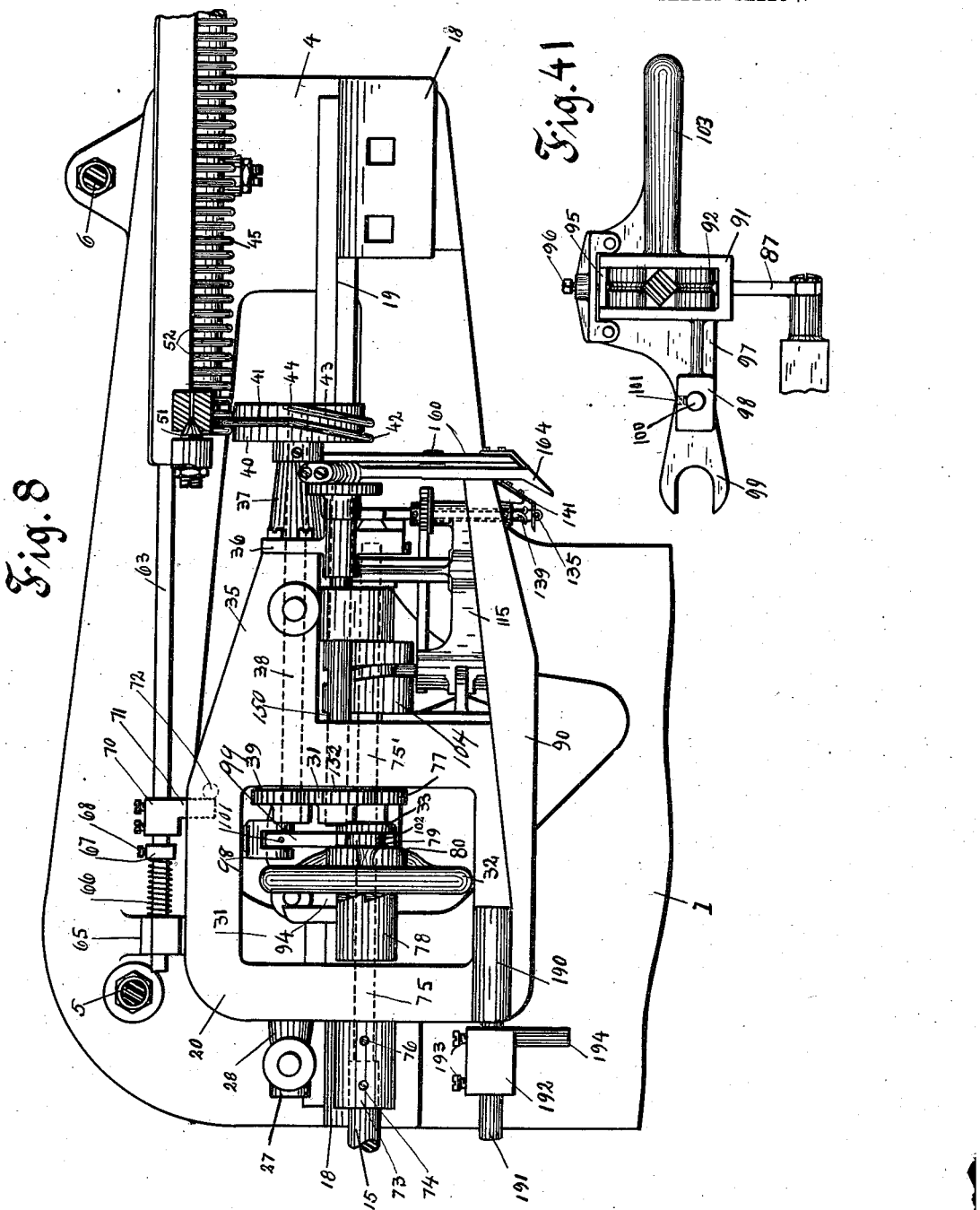

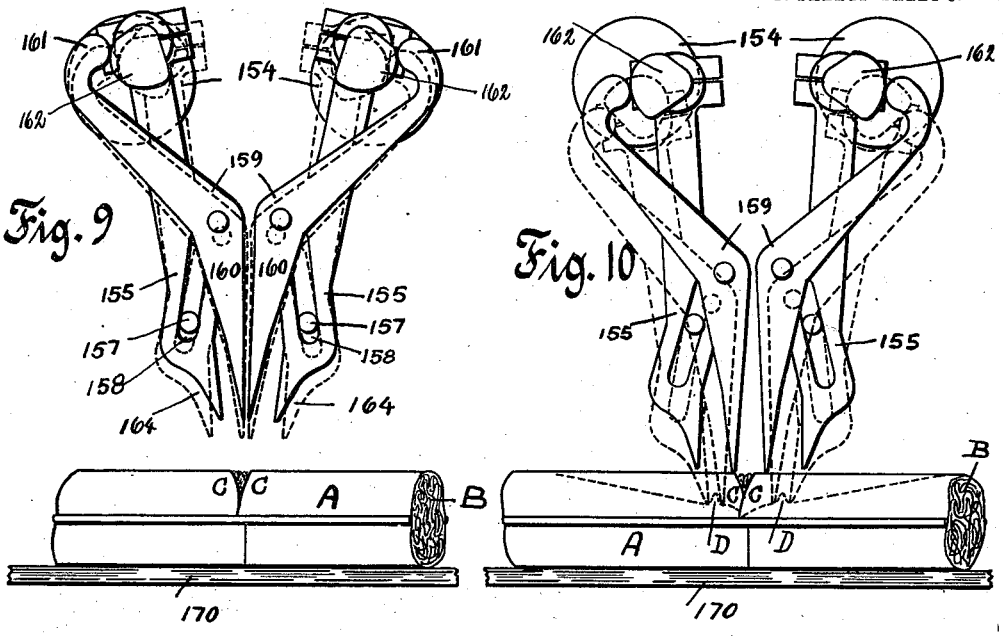
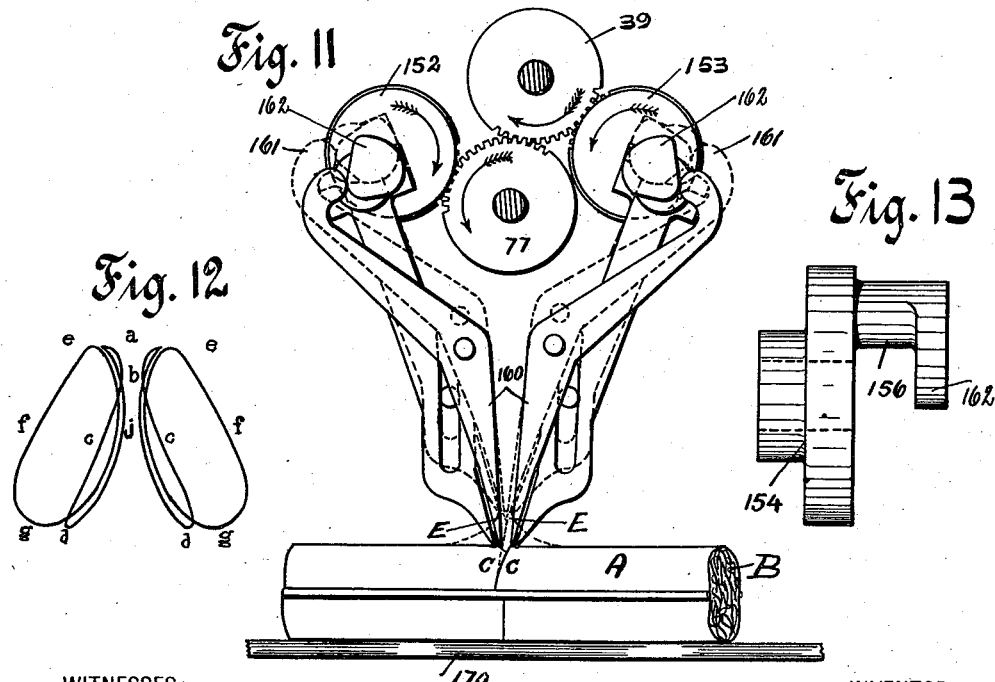

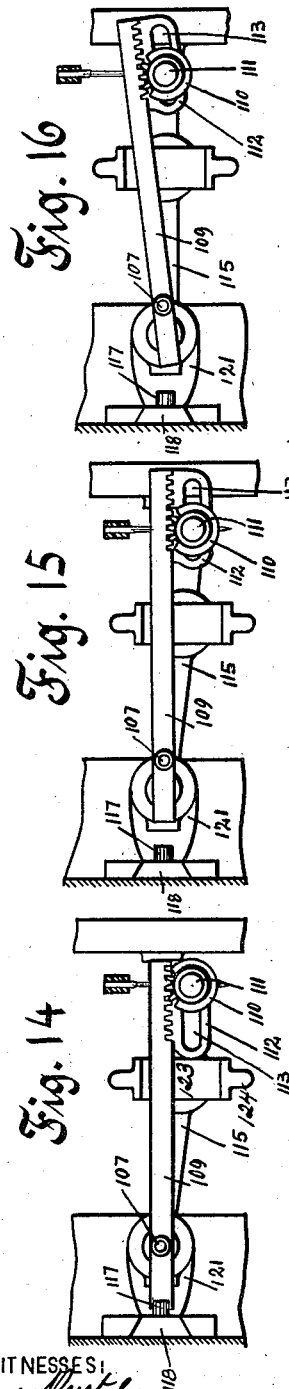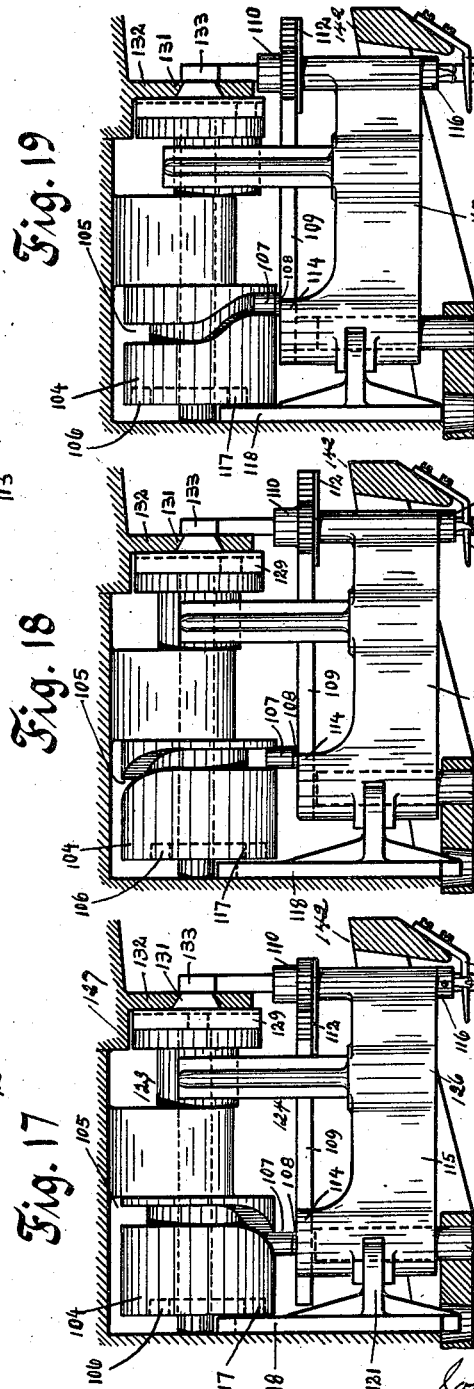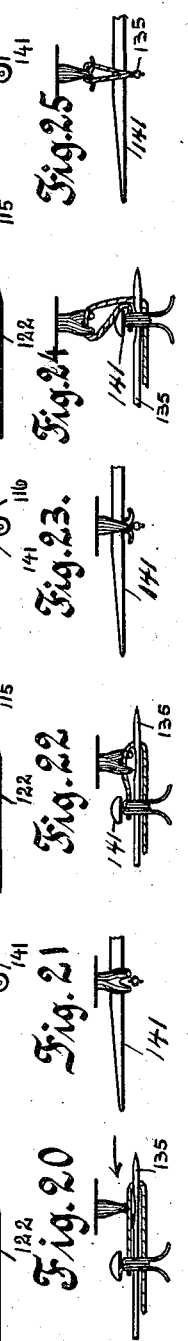

J. P. WEIS.
PAD SEWING MACHINE.
APPLICATION FILED SEPT. 22, 1910.
1,012,775.
Patented Dec. 26, 1911.
10 SHEETS—SHEET 10.
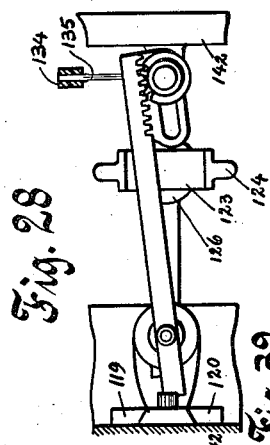
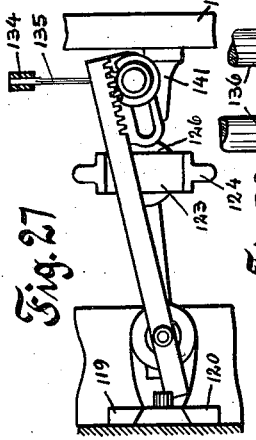
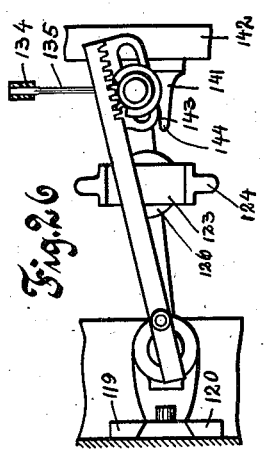
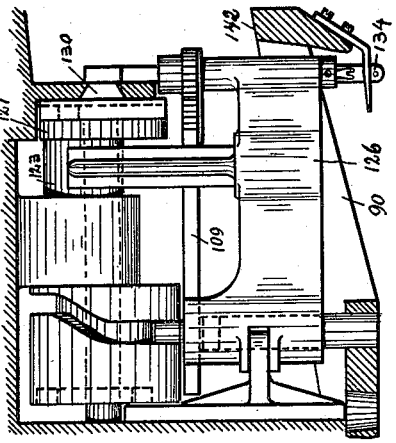
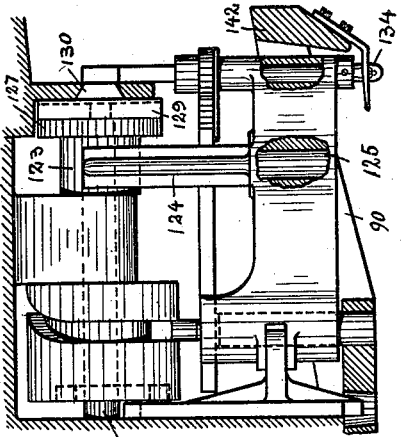
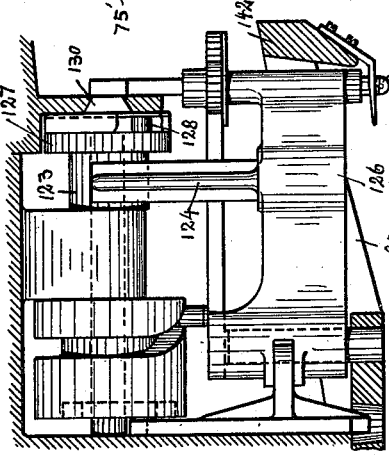
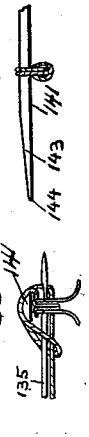
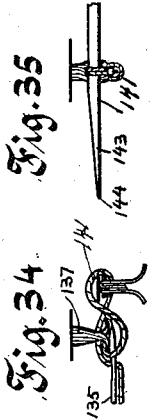
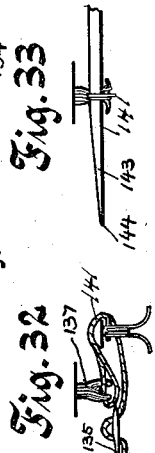
WITNESSES:
INVENTOR
John P. Weis
BY
ATTORNEY

UNITED STATES PATENT OFFICE.

JOHN P. WEIS, OF NYACK, NEW YORK, ASSIGNOR TO LUCIUS N. LITTAUER, OF GLOVERSVILLE, NEW YORK.

PAD-SEWING MACHINE.

1,012,775. Specification of Letters Patent. Patented Dec. 26, 1911.

Application filed September 22, 1910. Serial No. 583,145.

*To all whom it may concern:*

Be it known that I, JOHN P. WEIS, a citizen of the United States, residing at Nyack, in the county of Rockland and State of New York, have invented certain new and useful Improvements in Pad-Sewing Machines, of which the following is a specification.

This invention relates to sewing machines, but more particularly to a sewing machine specially adapted for sewing stuffed pads, such as those used in connection with harness hames for horses, the object of the invention being to provide an improved sewing machine of the character described for closing and stitching the opening through which the pad has been filled or stuffed, by drawing together the edges, simultaneously infolding them, and stitching them together with a suitable stitch, such as a single thread over stitch. Heretofore these filled or stuffed pads have been stitched by hand, and the operation has not only been very laborious, but slow and expensive, while the work produced was unsatisfactory by reason of the fact that the stitches varied in length, bite and depth, causing the same to gape open or flare in one place and be drawn tight in another, the hand sewing of the opening being difficult owing to the fact that the pads were in a stuffed condition by the filling of hair or jute, or other material, which caused the opening through which the pads had been stuffed or filled to spread the edges, thus requiring that the operator draw the edges together by hand, at the same time fold or turn the raw edges in, and also stitch such folded edges so drawn together while holding them in this condition, by the use of an ordinary hand sewing needle. To do away with this laborious, as well as slow and expensive procedure is the primary object of the present improvement, and this object is accomplished by providing an automatically operative machine which is effective to convey the pads into position to have the transverse opening thereof stitched in a superior and effective manner.

One of the objects of the present improvement is the provision of a sewing machine which will automatically convey the pads into position to bring the opening thereof into proper position to be operated upon by the stitching mechanism, the operation of which may be started on the positioning and stopping of the pad.

A further object of the improvement is the provision of an improved machine in which the sewing mechanism may be set in motion on the stopping of the pad in position to have its opening closed and stitched, and which pad will be automatically conveyed from the machine after the opening has been properly stitched, while another pad is simultaneously conveyed into position to be sewed.

A further object of the invention is the provision of means for controlling the stitching mechanism either pedally or manually, independently of automatically operative means for stopping it, whereby the machine is always under the control of the operator.

A further object of the invention is the provision of a machine of the character described, in which the return movement of the stitching mechanism to its initial or starting position will automatically start a conveying mechanism by means of which the previously stitched pad will be carried away from the stitching mechanism while an unstitched pad will be brought into position to be stitched.

A further object of the invention is the provision of an improved machine in which means is provided for automatically stopping the pad at the proper point, and means for starting the stitching mechanism on the stoppage of such pad, together with means for automatically returning the stitching mechanism to its initial or starting position and at the same time automatically stopping the stitching mechanism during such return, thereby to save thread.

A further object of the invention is to provide a form of stitching mechanism particularly adapted for stitching crosswise or transversely of such pad and by means of which the opening through which the pads are filled will be gripped, drawn together and the raw edges of the material around the opening will be infolded and stitched, and which stitching mechanism will move in one direction while the pad is conveyed to and from such stitching mechanism in a different or transverse direction.

A further object of the invention is the provision of a machine of the character described, in which sewing mechanism is provided for closing and stitching the openings of filled pads, and which sewing mechanism is suspended from above the work being stitched, while the material at each side of the opening to be stitched is drawn together, infolded and lifted into position to be properly stitched by the needle.

A further object of the invention is the provision of an improved machine in which the conveyer may be operated independently of the sewing mechanism proper and the sewing mechanism independently of the conveyer, the mechanisms being so organized that the sewing mechanism is always under the control of the operator.

A further object of the invention is to provide a machine of the character described with an improved form of stitching mechanism embodying gripping means for properly gripping the material at the sides of the opening of the pad, drawing such material together, infolding the raw edges thereof, and lifting the so infolded edges into position to be stitched by the needle, in connection with an improved looper and stitch forming device, by means of which as the stitching mechanism advances for the succeeding stitches the stitched seam will be discharged from the stitch forming device, and in which machine also the stitching mechanism will be automatically advanced one step for each stitch.

A further object of the invention is the provision of an improved machine in which the stitching mechanism will be always under the control of the operator for the starting and stopping thereof, either by the hand or foot, and whereby also the stitching mechanism will be advanced automatically and returned automatically to its initial or starting position and be inoperative during such return.

From the foregoing it will be observed that among the objects of the invention is the provision of an improved sewing machine by means of which the articles to be sewed are conveyed by an automatically controlled and operated conveyer into position to be sewed, and that on the automatic stopping of this conveying mechanism the sewing machine mechanism will be automatically advanced across the path of travel of the article to be stitched or sewed, and that when such article has been stitched or sewed the sewing mechanism starts to return to its initial position, thereby setting in operation the conveyer mechanism to deliver the stitched article from the machine and deliver an unstitched article into position to be stitched, while the stitching mechanism will be thrown out of operation automatically during the return thereof to its initial or starting position. In other words, the stoppage of the conveyer or delivery mechanism for the article to be sewed enables the sewing mechanism to be started, whereupon it is automatically advanced, and the return of the sewing mechanism to its starting position is effective to start the delivery mechanism, whereby the articles to be sewed will be continuously and automatically fed into position and stopped, sewed and fed away from the machine, and in which also the stitching mechanism may be controlled either by hand or foot.

Figure 2:
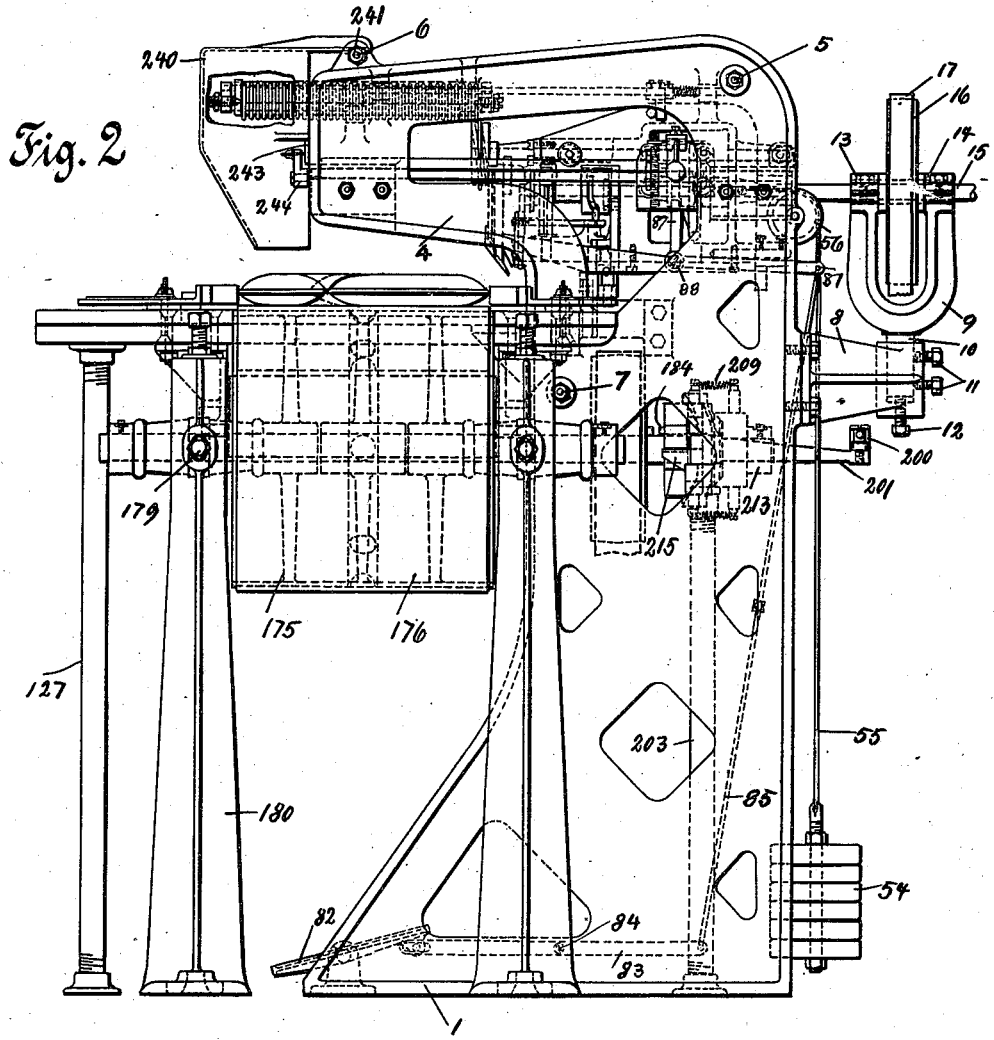
Figure 40:
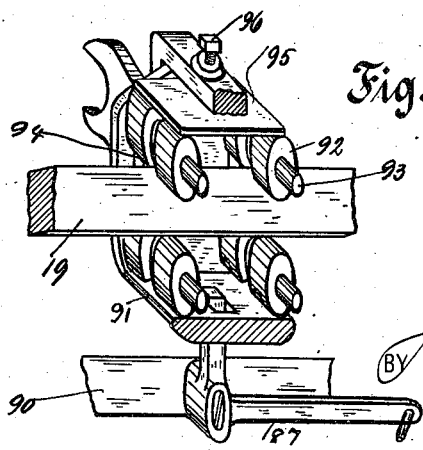
Figure 3:
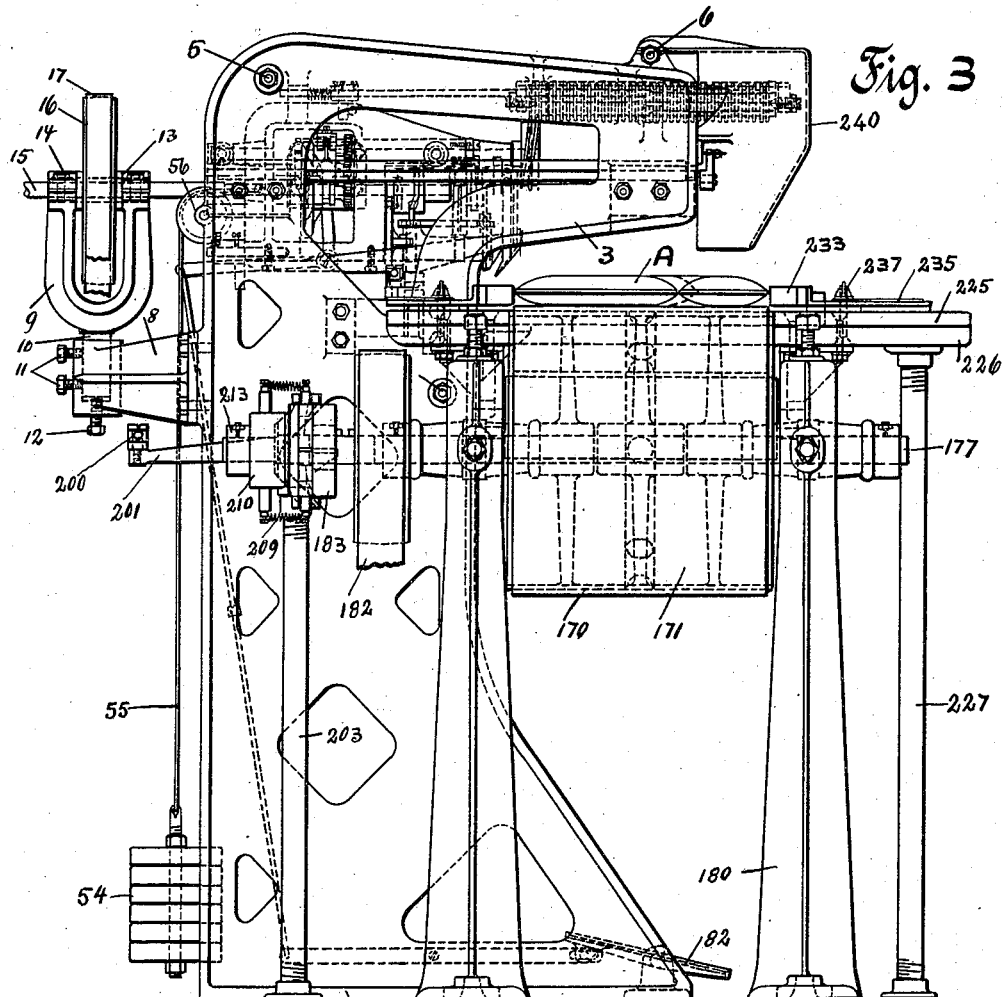
Figure 46:
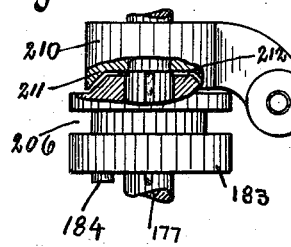
Figure 47:
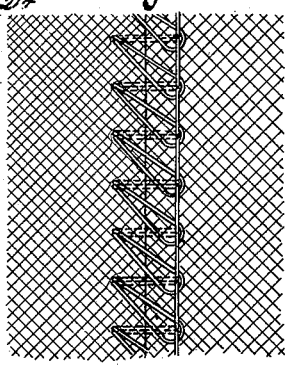

In the drawings accompanying and forming part of this specification, Figure 1 is a front elevation of this improved sewing machine, portions of the conveyer belt or delivery mechanism for the pads being broken away and the standards or supports for such conveyer mechanism moved close together in order that they may be shown in one figure; Fig. 2 is a right hand end elevation of this improved machine shown in Fig. 1; Fig. 3 is a left hand end elevation of the machine shown in Fig. 1; Fig. 4 is a top plan view of the machine shown in Fig. 1; Fig. 5 is an enlarged front end elevation of the sewing machine mechanism, illustrating the manner in which the material of the pad is gripped by the grippers and sewed by the needle; Fig. 6 is a detail front elevation showing a portion of the feed wheel cam and the feed roll bracket carrying the feeding roll shown in Fig. 5, in different positions illustrated respectively by full and dotted lines; Fig. 7 is a top plan view of the mechanism shown in Fig. 5; Fig. 8 is a cross-sectional view taken in line 8—8 Fig. 7, looking toward the right hand in said Fig. 7, the left hand standard, pad and conveyer being removed, and more particularly illustrating the sewing machine head carrying the stitching mechanism; Figs. 9, 10 and 11 are diagrammatic views illustrating the gripping mechanism, each of said views illustrating two positions, one by full lines and one by dotted lines, of the gripping fingers during the drawing together, infolding and lifting of the material to be closed and sewed; Fig. 12 is a diagrammatic view illustrating the path of travel of the gripping fingers; Fig. 13 is an enlarged detail view of the crank cam for operating the gripping fingers; Figs. 14 to 37, both inclusive, are detail views illustrating the manner in which the looper coöperates with the needle and stitch forming tongue or finger to form the stitch; Figs. 38 and 39 are detail views illustrating the looper from different sides; Fig. 40 is a detail perspective view of the means for automatically and also manually stopping and starting the stitching mechanism; Fig. 41 is a detail view of part of the mechanism shown in Fig. 40; Figs. 42, 43 and 44 are detail views of parts of the means for stopping the conveying mechanism at the proper time; Figs. 45 and 46 are detail views of a part of the means for controlling the conveying or delivery mechanism; and Fig. 47 is a plan view of the stitched material.

Similar characters of reference indicate corresponding parts throughout the figures of the drawings.

The present improved machine comprises in a general way sewing machine mechanism and conveying or delivery mechanism, and the sewing machine mechanism comprises a reciprocatory head carrying what will be hereinafter designated as the stitch forming mechanism, which comprises gripping mechanism, needle mechanism, looper mechanism and loop forming mechanism. The sewing machine mechanism also comprises means for advancing or feeding it step by step during the sewing of the article, means for returning it to its initial or starting position, means for rendering inoperative the stitching mechanism during the return of the sewing machine mechanism to its starting or initial position, and means for controlling, either by foot or hand, the operation of the stitch forming mechanism, while the conveying mechanism includes means for conveying the pad to be stitched into position to be operated upon and then away from the stitching mechanism, together with means for stopping the conveyer at a predetermined time and means for starting it, which latter means is controlled by the sewing machine mechanism on its return to its starting position.

In the preferred form of the machine shown, it comprises a pair of uprights or standards 1 and 2 having overhanging portions 3 and 4. These standards may be secured to the floor in any suitable manner and are connected together by tie bolts 5, 6 and 7. Bolted to the standards to project from the rear thereof is a bracket 8 supporting a U-shaped hanger 9, having a depending stem 10 secured in a socket of the bracket by suitable set screws 11 and adjustable therein by an adjusting screw 12 tapped into the bottom of the socket. This U-shaped hanger is provided with suitable bearings 13, 14 for the main driving shaft 15 of the sewing machine mechanism. Mounted on this shaft, between the members of the U-shaped hanger 9, is a driving pulley 16 carrying the driving belt 17 connected with any suitable source of power. This pulley is keyed to the shaft for continuous rotation therewith, while the shaft is permitted to have endwise movement relatively to its pulley so that it can move back and forth with the sewing machine head. The bracket supporting the U-shaped hanger may have a slight lateral adjustment by reason of the fact that it is provided with elongated slots through which pass the bolts which secure this bracket to the standards or uprights 1 and 2.

Secured to the standards at their front and rear are V-shaped blocks 18 which may in practice be adjustable, and supported by these V-shaped blocks, one by each standard, is a track 19. The blocks 18 may be adjustable vertically for the purpose of leveling and alining the tracks. The shiftable sewing machine head 20 is supported for to and fro movement on these tracks by four grooved wheels, two at the front, as 21, and two at the rear, as 22. The wheels 21 at the front are supported by shafts 23 carried by projections or hubs 24 of the sewing machine head. The grooved wheels at the rear are supported by shafts 25 carried by a pivotally supported bearing 26 mounted for swinging movement on a shaft 27 secured to a hub 28 projecting from the rear of the sewing machine head, thus to compensate for any defects that there may be in the alinement or parallelism of the tracks. The grooved wheels are mounted to turn freely on their shafts, and those supported by the track carried by the standard or upright 1 may have a slight end movement, while the two wheels carried by the track supported by the standard 2 are located between the collars 29 and 30, which serve to maintain the sewing machine head in proper position relatively to its track, while, as hereinbefore stated, the swiveling or rocking movement of the rear shaft will enable such shaft to rock or adjust itself to compensate for any variations in the height of the respective tracks and so prevent the machine head from rocking. Thus, by the provision of this means for supporting the sewing machine head the four wheels will have an equal contact on the tracks at all times.

The sewing machine head is provided at the rear thereof with an angular opening, shown as square, 31, in which is located the hand wheel 32 and clutch mechanism 33 for starting and stopping the machine, together with a series of gears for connecting the several shafts hereinafter referred to. The sewing machine head is also provided with an overhanging portion 35, to the front end of which is secured a plate 36, from which plate projects a hub 37 carrying the forward end of the feed wheel operating shaft 38. This shaft extends back through the head and has fixed thereto in the rectangular opening of such head a gear 39 for imparting rotary motion to the shaft. Secured to this shaft 38, at the forward end of the hub 37, is a feed wheel 40 having on its periphery what may be considered an intermittent pitch screw cam 40'. This wheel 40 rotates with the shaft 38. A cam flange 41 extends around the wheel about three-quarters of its circumference centrally of the sides thereof, the remaining one-quarter of the circumference of the flange turning off at an angle, as indicated at 42, and terminating or ending at the edge of the wheel, while the other end 43 of the flange extends at an angle to the body of the wheel and parallel with the portion 42 of the flange and terminates or ends at the opposite edge of the wheel, as at 44, see Fig. 8. This flanged wheel coöperates with a feed roll 45 to feed the sewing machine head, and thereby the sewing machine mechanism, step by step forward to properly stitch the work.

For supporting the feed roll 45 the upright or standard 1 is provided with a pair of projections, 46, 47, provided with conical sockets for the reception of conical screws 48 carried by the feed roll frame 49, see Fig. 7, whereby the feed roll frame is supported for swinging movement. This feed roll frame is of skeleton formation and provided with an elongated opening 50 in which there is supported for rotary movement by suitable conical screws 51 the feed roll 45. This feed roll is made up of a series of parallelly located flanges 52 forming grooves therebetween, the grooves receiving the cam flanges of the feed wheel hereinbefore referred to.

Secured to the forward end of the feed roll is an eccentric 53 made from fiber or some other suitable material, which is engaged at the proper time by the flange of the feed wheel when the sewing machine head has been fed forward to the limit of the work to be stitched, so as to raise the feed roll from engagement with the feed wheel and thus terminate the advance or feeding movement of the sewing machine head. In other words, as the feed wheel is rotated the angular or inclined portions of the feed wheel flange coöperate with the grooves between the parallelly located flanges of the feed roll and draw the machine head bodily forward along its tracks; this feeding forward of the machine head occurring so long as the inclined or angularly disposed flanges of the feed wheel are in engagement with the feed roll, while the machine head remains stationary as long as the straight portion of the feed wheel flange is in engagement with such feed roll. Thus the sewing machine head is fed forward bodily, intermittently or step by step, each step being equivalent to a stitch and corresponding with one groove of the feed roll. That is to say, at each revolution of the feed wheel carrying the sewing machine head this head advances from one groove of the feed roll to the other until the head has been fed forward along the entire length of the feed roll, the head remaining stationary during a part of the rotary movement of the feed wheel corresponding to the length of the straight portion of the flange or projection on such feed wheel and which, as hereinbefore stated, is about three-quarters of the circumference of such feed wheel. When the head has been advanced sufficiently to bring the feed wheel into engagement with the fiber eccentric at the end of the feed roll the straight portion of the projection coöperates with this eccentric and lifts the feed roll carried by its swinging bracket from the position shown in dotted lines to the position shown in full lines in Fig. 6, thereby severing the engagement between the feed wheel and the feed roll and so stopping the advance of the sewing machine head. As the feed wheel coöperates with the feed roll a rotary motion is imparted to the latter by reason of their frictional contact, so that the feed roll gradually gains in speed during this engagement until it has reached a speed of two to one of the feed wheel, the diameter of the feed wheel being considerably larger than that of the feed roll, so that by the time the feed wheel reaches the eccentric the rotary motion of the feed roll has caused the eccentric to coöperate with the straight flange of the feed wheel, and consequently it will be positively lifted. The swinging feed roll frame is provided with a projection 57, see Figs. 6 and 7, adapted to coöperate with a fiber plug 58 carried by a projection 59 on the standard or upright 2. The position of this fiber plug is determined by means of an adjusting screw 60, which may be locked in its adjusted position by a lock nut 61, and this affords a means for limiting the downward movement of the swinging feed roll frame. In other words, by means of the adjusting screw just described the proper coöperating engagement of the feed wheel and the feed roll may be maintained at all times.

The return of the sewing machine head to its initial or starting position to stitch another pad is obtained by means of weights 54 supported by cables 55, the ends of these cables being secured in any suitable manner to the sewing machine head at the rear thereof and are guided by suitable rolls 56 supported by the standards or uprights 1 and 2. During this return movement of the sewing machine head to its initial or starting position it is necessary, however, to provide means for preventing the reëngagement of the feed roll with the feed wheel, in other words, for holding the feed roll and its frame in its raised position shown by full lines in Fig. 6. Adjacent to the projection 59 carried by the standard 2 is a similarly formed projection 62 provided with a slot to receive a square rod 63, which is held within its slot by means of a cap 64, the rod being free to move longitudinally within its slot. The standard 2 is provided at the rear thereof with a similar projection 65 having a similar angular slot and cap for the rear end of this sliding rod. A spiral spring 66 surrounds the rod 63 between the bearing or projection 65 and an adjusting collar 67 secured to the rod by a set screw 68. By means of this spring the rod is held under tension in one direction, in other words, the spring has a tendency to force it constantly forward, such forward movement being limited by a stop or pin 69 secured to the rod 63 and adapted to contact with the projection 62 carrying the forward end of the rod. Thus the end movement of the rod 63 is limited by the location of the pin 69. This rod is also provided with an adjustable stop 70 secured thereto by suitable set screws, and this adjustable stop is provided with a depending portion 71 in position to coöperate with a pin 72 secured to the sewing machine head and by means of which when the head returns to its initial or starting position the rod 63 will be shifted backwardly against the tension of its spring. This rod 63 has its forward end abutting against the lug or projection 57 of the swinging feed roll frame, see Figs. 6 and 7, thus maintaining the spiral spring 66 under compression to enable it to shift the rod forward at the proper time, and as this swinging frame is lifted by means of the feed roll and the eccentric hereinbefore described the spring 66 moves the rod forward until the stop pin 69 comes into engagement with the projection or bracket 62, at which time the forward end of the rod is pushed underneath the projection or lug 57 of the swinging feed roll frame and so maintains it in its raised or lifted position until the pin 72 of the sewing machine head has moved backward and engaged the depending portion 71 of the adjustable stop 70 and returned the head to its normal position, thereby withdrawing the forward end of the rod from under the projection 57 of the swinging feed roll frame and permitting the same to descend again into engagement with the feed wheel, at which time the feed wheel is again in position to coöperate with the first groove of the feed roll, at the inner end thereof, whereupon the sewing machine head will again be fed forward in the manner hereinbefore described, on the connection of the clutch members either automatically or by hand or foot in the manner hereinafter described.

From the foregoing it will be observed that the machine head carrying the stitching mechanism to be hereinafter described is continuously fed forward after it is started by the operator, and intermediate each feeding forward is returned without interruption. Means, however, is provided to permit the operator to control this feeding movement and stop the advance of the sewing machine head at any time, which means will be referred to hereinafter.

For driving the feed wheel shaft 38 carrying the feed wheel 40, the main driving shaft 15 carrying the driving pulley hereinbefore described has its inner end secured within a coupling sleeve 73 by means of a set screw 74, within which a short shaft 75 is also secured by means of a similar set screw 76, whereby these two shafts are rigidly connected for rotation together, see Fig. 8. This shaft 75 is journaled adjacent to its rear end in the machine head 20 and extends into the angular opening thereof, see Fig. 8. Another alined shaft 75' is journaled in the machine head forwardly of the angular opening thereof with its rear end extending into such opening, and on this shaft is secured a gear 77 which meshes with the gear 39 carried by the shaft 38 to which the feed wheel is fixed.

Carried by the shaft 75, within the angular opening of the machine head, is a clutch one member of which, as 78, is fixed to the shaft 75 for rotation therewith. This clutch member 78 coöperates with a companion clutch member 79 secured to or formed as a part of the hub of a hand wheel 80 splined or keyed to the shaft 75', whereby the hand wheel clutch member can be thrown into or out of engagement with the fixed clutch member 78 either manually or pedally, thereby to enable the operator to operate the stitching mechanism in the usual way by turning the hand wheel, and it is also thrown out of engagement automatically on the return of the sewing machine head to its starting position, by the means hereinafter described.

From the foregoing it will be observed that when the clutch members are disengaged the stitching mechanism hereinafter described is out of operation except by the turning by hand of the hand wheel, and that the feeding of the machine forward is likewise stopped, but that when the clutch members are in engagement not only is the stitching mechanism automatically operated but the feeding forward of the sewing machine mechanism is accomplished. The forward end of the short shaft 75 projects beyond the fixed clutch member 78 and has a bearing in the shiftable clutch member 79, whereby the two shafts 75 and 75' are maintained in alinement. The forward end of the shaft 75', also has a bearing in the sewing machine head.

For automatically separating the clutch members, thereby to stop the stitching mechanism on the return of the sewing machine head to its initial or starting position, and for enabling the operator to engage and disengage the clutch members, suitable means is provided. Secured adjacent to the floor, on the inside of the standards or uprights 1 and 2, are brackets 81 to which is pivotally secured a treadle 82. Pivotally connected to this treadle is a lever 83 pivoted to the standard 2, as at 84. The rear end of this lever is connected by means of an adjustable rod 85, adjustable by means of a coupling 86, whereby the length of the rod is adjusted and the upper end of this rod 85 is pivotally secured to a bell crank lever 87, which is pivotally secured at 88 to a hub 89 projecting from the lower part or base plate 90 of the sewing machine head, see Figs. 2 and 5. This bell crank lever 87 has one part thereof extending upward and connected with the lower plate of a bracket 91, see Figs. 5, 40 and 41. This bracket is substantially U-shaped and is provided with four grooved rolls 92 coöperating with one of the V-shaped tracks, as for instance the track carried by the standard or upright 2. These rolls are supported by short shafts or stems 93 projecting into slots 94 of the side wall of the U-shaped bracket, see Figs. 5 and 40. For applying a tension to the rolls a spring plate 95 is located to engage the top peripheries of the upper set of rolls, and the desired tension is applied thereto by means of an adjusting screw 96 tapped into the bracket, whereby the spring plate is forced downward on the rolls and thereby draws the bottom set of rolls up against the bottom of the track, whereby this clutch box may operate along the track under the desired tension caused by the adjusting screw 96 and the spring plate 95. The inner side wall of this U-shaped bracket is provided with a ribbed projection 97, see Figs. 5 and 41, which is slotted, as at 98, to receive the fork 99 pivotally secured therein by a pin 100, see Figs. 5, 8 and 41, the end movement of this pin being controlled by a set screw 101. This fork 99 operates in the groove 102 of the shiftable clutch member 79 of the hand wheel clutch hereinbefore described. Projecting from one of the walls of this U-shaped bracket is a handle 103 extending through an opening in the standard or upright 2, see Figs. 2, 5 and 41, which may be grasped by the hand of the operator and so manipulated as to open or close the hand wheel clutch as may be desired, by shifting the shiftable clutch member 79 toward or from the fixed clutch member 78 on the shaft 75.

From the foregoing it will be understood that by properly depressing the treadle the lever connected thereto will be shifted so as to shift the connecting rod 85, and thereby the bell crank lever 87, and through the clutch box on its track will shift the forked lever 99 and thereby shift the shiftable hand wheel clutch member into engagement with the fixed clutch member 78, so that the sewing machine mechanism will be fed forward in the manner hereinbefore described and the stitching mechanism thrown into operation, while the manipulation of the treadle in the opposite direction will have a reverse effect, stopping the feeding of the sewing machine mechanism and also the stitching mechanism. When the sewing machine head has been fed forward to the end of the feed roll and the feed roll is lifted from the feed wheel, the weights automatically return the head to its starting position. As the head, however, starts to return to its initial position the friction of the clutch box on the track causes it to hang back slightly and thus, through the medium of the clutch shifter 99, shift the hand wheel clutch member away from the fixed clutch member 78 and so stops the stitch forming mechanism, thus permitting the sewing machine head and its stitch forming mechanism to return to its initial or starting position without waste of thread. In other words, the retardation of the clutch box by its frictional engagement with the track effects the disconnection of the clutch members as the sewing machine head starts to return to its initial position. From this it will be observed that two independent means of controlling the movement of the sewing machine mechanism and the stitching mechanism have been provided, both simple and effective in operation and accessible to the operator at all times. The U-shaped bracket, together with the parts carried thereby, it will be observed, as well as the bell crank lever 87, move to and fro with the sewing machine head, the adjustable rod 85 swinging on its pivotal connection with the connecting lever pivoted to the treadle. As the length of travel of the sewing machine head is relatively short as compared with the length of this connecting rod, it will have no appreciable effect upon the treadle, so that the latter will remain substantially stationary, and not be felt by the foot of the operator.

From the foregoing it will be observed that either through the medium of the treadle or of the handle just described the shiftable clutch member carried by the hand wheel may be thrown into or out of engagement with the fixed clutch member secured to the driving shaft 75 connected with the main driving shaft 15. The stitching mechanism carried by the sewing machine head is likewise operated from the main driving shaft 15 through the medium of the shafts 75 and 75′. Secured to the shaft 75′, between its bearings, is a drum cam 104, see Figs. 8, 17, 18 and 19, provided with a cam groove 105 and in its rear face with another groove or slot 106. Operating in the groove 105 is a roll 107 carried by a stud 108, which is secured at the rear end to a rack 109, see Figs. 8, 14, 15, 16, 26, 27 and 28. This cam groove imparts horizontal reciprocatory movement to the gear rack, which in turn oscillates a gear 110 secured to the looper shaft 111, the gear rack being held in mesh with the gear of the looper shaft by means of an adjusting plate 112 secured to the gear rack in any suitable manner and provided with an elongated slot 113 which straddles the gear shaft 111 and thus affords a means of adjusting the gear teeth of the gear rack so as to properly mesh with the gear 110 of the looper shaft. It will of course be understood that the path of the cam groove in the cam drum 104 is such as to cause the stud secured to the rack bar to move back and forth and thus cause the looper shaft to oscillate in the manner desired. The inner end of this rack bar is guided by a slot 114 carried by the looper bracket 115, in which the looper is journaled, the lower end of the looper shaft being provided with a collar 116 secured thereto by screws, one of which extends through the collar into the shaft so as to impinge the end of the looper shank 136 and thereby secures the looper proper to the shaft. This looper may be adjusted by this means within the shaft as may be desired.

Operating in the cam slot 106 of the cam drum 104 is a stud roll 117, which is secured to a dovetail slide 118, whereby the slide is caused to have a vertical rise and fall movement as the stud roll moves in the slot of the cam drum. This dovetail slide moves freely between guide strips 119, 120, one of which, as 120, may be adjustably secured for the purpose of taking up the wear of the head and simplifying the manufacture of the parts. This dovetail slide is provided with a forked projection 121 operating in a slot of the looper bracket 115. This looper bracket is mounted to swing on a stud 122 supported by the base plate 90 of the sewing machine head, and the bracket is free to move up and down through the medium of the dovetail slide and the cam slot 106 of the cam drum 104, while at the same time this bracket may be swung to and fro by means of an eccentric 123 mounted on the shaft 75', which eccentric is straddled by a fork 124 having a stem 125, which turns freely in a socket 126 of the looper bracket 115, whereby as the eccentric rotates within its fork 124 the stem 125 of the bracket will have a slight swivel or turning movement in the socket of the looper bracket 115. Thus it will be observed that through the mechanism described the looper has an oscillatory movement, and also a movement up and down and a movement from side to side, or a step over movement.

The eccentric 123 is provided with an enlarged portion 127 carrying a stud roll 128, which operates in a cross head 129, which is a part of the dovetail slide 130 operating in the dovetail groove 131 formed in the end plate 132 forming a part of the sewing machine head. One wall of this dovetail groove may be adjustably secured to this end plate, thereby to compensate for wear of the dovetail slide 130. Secured to this dovetail slide 130 is a depending arm 133 provided with a needle socket 134, and in which a horizontally located thread carrying needle 135 is clamped. By this means the needle is reciprocated back and forth in a horizontal path. The looper 137, see Figs. 38 and 39, has a pair of oppositely projecting prongs 138 and 139.

The operation of the looper and the needle is as follows: By reason of the cam drum 104 a rising and falling movement is given to the dovetail slide 118 through the medium of the cam groove 106, which motion is imparted to the looper bracket 115, and as the looper bracket swings to the right by means of the eccentric 123 operating in the fork 124 swiveled in the looper bracket 115 it moves the looper bracket to the position shown in Figs. 14 to 17, 19 and 20. By examining Figs. 20 and 21 it will be observed that the needle is in position between the prongs 138 and 139 of the looper and the needle is about to move backward in the direction of the arrow, see Fig. 20, which causes it to deflect the loop in the usual manner, as shown in Fig. 22, which loop is deflected into the crotch 140 formed between the prongs 138, 139 of the looper, at which time the cam groove 105 of the cam drum 104 causes the rack to manipulate the gear of the looper shaft, which thus turns the looper so that its prongs will engage the loop of the thread, as shown in Figs. 22 and 23. As the thread is engaged by the looper prongs the looper is lifted upward through the medium of the looper bracket and the cam groove 106 of the cam drum 104, at which time the eccentric 123 operating in the fork 124 causes the looper bracket to swing over a chaining finger or tongue 141, which is adjustably secured by screws to a projection 142 of the base plate 90 of the sewing machine head, and over which chaining finger the thread loop is drawn as indicated in Figs. 24 and 25, the looper swinging to the left of this finger and into position shown in Figs. 32 and 33, where it again descends in such a manner as to give the thread loop to the needle at the left of the tongue. From an inspection of Figs. 33 and 34 it will be seen that the needle has now entered the thread loop and is about to penetrate the goods for the succeeding stitch, as indicated by Figs. 36 and 37, thus completing the formation of the single thread over stitch. Thus the loop of thread extends from the material on the right side of the tongue, up over and to the left side thereof, binding the seam of the material to the tongue or chaining finger as the stitches are formed. These operations are repeated for the formation of each stitch, and after several such stitches are formed over the chaining finger or tongue they gradually feed down the inclined portion 143 and are shed or disengaged from the narrow end thereof. This chaining finger or tongue is broad where the stitches are formed and tapers gradually to the point 144, so that as the stitches are tightened the tendency of such stitches is to move toward the end of the tongue and drop therefrom. This tongue may be adjusted to and from the needle for the purpose of making a wide or a narrow seam, since, when as will be seen from an inspection of Fig. 5, the work is lifted, it will contact with the tongue or chaining finger hereinbefore described and thus establishes a margin between the edge of the work and the point where the needle penetrates, and therefore by raising the tongue a wide seam may be made, while by lowering it, or adjusting it closer to the needle, a narrow seam will be produced.

The seam forming or gripping mechanism is supported on the base plate 90, which has forwardly extending portions 145, 146 reaching out in front of the looper bracket, which projecting portions are connected by a cross piece 147, which is also connected to the chaining finger projection 142, see Fig. 5. This gripping mechanism comprises two pair of gripping fingers, the fingers of each pair connected together for opening and closing movement and for up and down movement to grasp and lift the material, the organization of the gripping fingers being such that the material will be grasped at each side of the opening to be stitched by a pair of the fingers and the raw edge of such opening simultaneously infolded as the material is raised and drawn together to be stitched.

Journaled in the sewing machine head is a pair of shafts 150, 151. The inner ends of these shafts carry gears 152, 153 fixed thereto, the gear 152 being in mesh with the gear 77 of the short driving shaft 75, which, as hereinbefore stated, imparts motion to the feed wheel shaft 38 and which in turn is in mesh with the gear 153, whereby motion is imparted from the main driving shaft 15 through the short shaft 75 and supplemental shaft 75' to the gripper shafts 150 and 151. On the outer end of each of these shafts 150 and 151 is secured a crank and cam 154, formed as an integral structure. One gripping finger of each pair has its upper end connected to the crank portion 156 of the crank cam 154 so as to operate freely thereon. Each of the gripping fingers 155 is supported by shoulder screws 157 adapted to work in elongated slots 158 of the gripping finger, these screws 157 being carried by the cross piece 147 hereinbefore referred to, see Fig. 5. The slots 158 are of sufficient length so that the motion transmitted from the crank will not cause the ends of the slots to contact with the screws 157. In other words, the slots are slightly longer than the travel of the fingers up and down. Each of these fingers 155 is provided with a projecting lug 159, to which is pivotally secured the companion gripping finger 160, so that the two gripping fingers 160 have a rise and fall movement simultaneously with the rise and fall movement of the gripping fingers 155. Each of the gripping fingers 160 has its upper portion extended outward at an angle to the gripping portion of the finger, terminating in a circular enlargement 161 and in position to coöperate with the cam portion 162 of the crank cam 154, the two gripping fingers 160 being held in close engagement with the crank cams by means of a coiled spring 163, see Fig. 5. Each of the gripping fingers is provided with a serrated jaw 164, those of the gripping fingers 160 being removable therefrom and being secured thereto by screws 165, so that as they become worn they can be readily removed and re-formed or replaced. The serrated jaw of each gripping finger 160 coöperates with the positively acting finger 155, and by an inspection of Figs. 9, 10 and 11, the operation of these jaws will be readily understood. In each of these figures the dotted lines represent one position of the jaws while the full lines represent another. For instance, in Fig. 9, the full lines represent the jaws as they are starting to descend, while the dotted lines show them descended to a greater extent. In Fig. 10 the full line position shows the jaws about to contact with the work, while the dotted line position shows the jaws gripping the work and starting to infold the raw edge by reason of the fact that the work is gripped away from the edge of the work and lifted. In Fig. 11 the full line position of the jaws illustrates them drawing the work together to form the seam, while the dotted line position shows the work lifted by the jaws into position to be sewed.

From the foregoing it will be observed that a pair of gripping fingers, one a spring controlled finger and the other a positively acting finger, operate at each side of the opening to be sewed, each pair of fingers having the same movement and operated in the same manner.

Fig. 12 is a diagrammatic view illustrating the movement of the respective gripping fingers, from which it will be seen that the spring controlled jaws or fingers 160 start to descend on the line indicated by $a$ and cross at $b$, operating along the lines at $c$ to the point at $d$, at which time the enlarged portions of the spring controlled jaws 160 are in contact with the eccentric portion 156' of the crank portion 156 of the cam 154, thus permitting the spring controlled jaws to close relatively to the positively acting jaws. The positively acting jaws or fingers descend simultaneously with the spring controlled jaws along the line indicated by e, Fig. 12, at which time the spring controlled jaws are at the point a. f indicates the position of the positively acting jaws while the spring controlled jaws are at c.

g represents the position of the positively acting jaws when the spring controlled jaws are at d, at which time the positively acting jaws close, as shown in the dotted line position in Fig. 10, and grip the material, whereupon they start upward in the paths indicated by j, at which position the work contacts with the chaining tongue or finger and is penetrated by the needle. In these figures the work or pad is indicated by A, while the stuffing or filling thereof is indicated by B, and the edges of the opening to be closed by C.

From the foregoing it will be observed that as the fingers or jaws plunge into the work at each side of the opening a portion thereof between the jaws is forced or borne upward, as indicated at D, so that as the work is further lifted the raw edges are inturned or infolded, as shown at E, so that when the seam is sewed no raw edges will appear. Thus the raw edges are automatically inturned or infolded as the work is lifted and presented to the needles. From the foregoing it is believed that a clear understanding of the operation of these jaws or fingers will be had without a more detailed explanation of the action of the crank cams, these crank cams 154 operating to open and close the jaws simultaneously with the raising and lowering thereof.

The conveyer mechanism for the work or pad is thrown into operation on the return of the sewing machine head to its starting position, and this conveyer mechanism comprises a traveling belt 170 operating in the direction of the arrow shown in Fig. 1. The conveyer belt passes around a pulley 171, which pulley is provided with a series of openings 172 for the reception of a series of projections or buttons 173 secured to the underside of the belt in any suitable manner. These projections are equally spaced apart and extend the entire length of the belt, which is endless, and coöperate with the apertures in the pulley 171, and thus the conveyer belt is positively driven and prevented from slipping, while the necessity of operating the belt under considerable tension is obviated. A number of the projections on the belt are in coöperation with the pulley at all times. The opposite end of the belt is supported by a pair of idle pulleys 175, 176, of the same diameter as the pulley 171 and spaced apart to permit the projections to pass between the opposed edges of the pulleys. The pulley 171 and idle pulleys 175, 176 are supported respectively by suitable shafts 177, 178, in suitable bearings, by means of adjusting screws 179 carried by suitable uprights or standards 180. The belt shown as broken away passes over idler pulleys 220 and 221 supported by hangers secured below the table hereinafter described, and by this arrangement of idler pulleys 220 and 221 the belt is prevented from contacting with the clothing of the operator and at the same time insures a firmer engagement of the belt with the driving pulley or drum 171. The circumference of this driving drum represents the length of the longest article to be carried by the conveyer, so that one revolution thereof will advance the article to the stitching mechanism in readiness to be stitched.

On the shaft of the pulley 171 is loosely mounted the conveyer driving pulley 181, to which motion is imparted from any suitable source of power by means of a belt 182. Thus the conveyer driving pulley may continuously rotate, power being imparted therefrom to the belt driving shaft through the medium of a clutch mechanism comprising a shiftable clutch member 183 splined or keyed to the shaft 177 and having a projecting pin or clutch face 184 adapted to coöperate with a similar projecting pin or clutch face projecting from the fly wheel or conveying belt driving pulley 181, whereby when the clutch member is shifted to have its clutch face engage with the clutch face of the pulley 181 the shaft 177, and thereby the conveyer belt pulley 171, will be operated. For operating this clutch member the sewing machine head is provided at its lower rear end with a hub 190 in which is adjustably secured in any suitable manner a stud 191 projecting therefrom. On this stud is located an adjustable block 192 secured thereto by screws 193, whereby the block may be adjusted along the length of the stud. This block 192 has a projection 194 extending below the base plate 90 of the sewing machine head. This projection 194 coöperates with a latch 195, see Figs. 4, and 43, pivotally secured in the bifurcation of a bell crank lever 196, which in turn is pivotally secured to the standard or upright 1. A flat spring 197 is secured to the bell crank lever in such a manner that the end of the spring engages the latch 195 so as to hold the same in an extended position to coöperate with the projection 194 carried by the sewing machine head when the latter is returning to its starting position. Connected to the opposite end of the bell crank lever 196 is a coupling member 198, the end of which receives a threaded rod 199, the opposite end of which rod is threaded into a similar coupling member 200 connected to the clutch shifter 201, see Fig. 4. In this figure the rod 199 is broken off due to the fact that the conveyer belt supporting pulleys have been moved into closer relationship to illustrate them in one view, so that when the parts are properly positioned in the machine the rod 199 will be a relatively straight rod running from the bell chank 196 to the clutch shifter 201. This clutch shifter 201 is supported by means of a bearing 210, to which it is pivotally secured and which in turn is supported by a post 203, which may be secured to the floor, this post being threaded at each end for the purpose of regulating the position of the clutch to correspond with the position of the conveyer pulley when the same is adjusted in its bearings by the screws hereinbefore referred to.

The clutch shifter or lever 201 is bifurcated and provided with two forked arms 204, see Figs. 4, 42 and 43, one below and one above the shiftable clutch member 183 splined to the shaft 177 as hereinbefore described. The clutch member is provided with a groove 206 see Fig. 46, in which operates a split ring 207, see Fig. 44, provided with two studs 208, each operating in a forked end of the clutch shifter or lever 201, see Fig. 4. These studs have connected therewith spiral springs 209 connected to the bearing 210, see Figs. 3 and 4, for the purpose of holding the shiftable clutch member open or away from the flywheel or driving pulley. This bearing is bored to fit the shaft 177 freely and is provided with a conical recess 211 adapted to coöperate with a conical projection 212 carried by the shiftable clutch member 183, these conical surfaces thus serving as frictional means to assist in the stopping of the shiftable clutch member at a certain time. A suitable collar 213 is provided on the end of the shaft 177 for adjusting the bearing 210 and clutch member 183. The bearing 210 is provided with a circular enlargement 214 for pivotally supporting the clutch shifter or lever 201, as hereinbefore stated, thus making a rigid connection between the post and the bearing 210 for the clutch shifter 201.

From the foregoing it will be understood that the shiftable clutch member may rotate with the driving shaft 177 by reason of the groove 206 formed therein and the ring 207 which works in the groove and the studs 208 of which coöperate with the forked ends of the clutch shifter in the usual manner. The clutch shifter is provided with a projection 215 between the arms thereof, see Fig. 42, which projection coöperates with a peripheral projection 216, see Fig. 45, of the shiftable clutch member 183 for the purpose of stopping the rotation of the clutch member after each complete revolution of the traveling belt drum 171.

From the foregoing it will be seen that the sewing machine head is maintained under tension by the weights 54, the tension being regulated by the number thereof which are used, and therefore as the feed wheel reaches the end of the feed roll and the projection or flange of the feed wheel coöperates with the eccentric on the end of the feed roll and lifts such feed roll out of engagement with the feed wheel the weights connected to the machine head cause the head to move backward, at which time the projection 194 at the rear of the machine head operates the latch 195 and thereby the bell crank lever 196, which in turn, through the rod 199, operates the clutch shifter or lever 201, thereby to shift the shiftable clutch member 183 so as to release the stop 215 from the peripheral projection 216 and shift the clutch member into engagement with the clutch face of the fly wheel 181, whereby the conveyer belt drum 171 is caused to make one revolution, at which time the projection 194 at the rear of the sewing machine head has moved the bell crank lever 196 to such a position or angle that the said projection 194 will be disengaged from the latch 195 of the bell crank lever 196 as the sewing machine head continues backward to its starting position. When the shiftable clutch member 183 is moved to its operative position with the fly wheel 181 the springs 209 are under extreme tension, and as the latch 195 disengages the projection 194 the springs return the clutch member 183 and the bell crank lever and latch to their normal position, at which time the peripheral projection 216 coöperates with the projection 215 on the clutch shifter and stops further rotation thereof.

From an inspection of Figs. 2 to 7 it will be observed that the machine head, with its stitching mechanism, stands at its initial or starting position, while the pad to be sewed is in such position on the conveyer belt that its opening is in alinement with the gripping fingers. Now, by manipulating the treadle the hand wheel clutch members 78 and 79 hereinbefore described are brought into engagement, whereby the feed wheel is operated, and in connection with the feed roll the sewing machine head is fed forward. Assuming that a series of stitches have been formed over the chaining finger or tongue, the machine continues to sew and is advanced forward by the feed wheel and feed roll hereinbefore described until it meets the inner edge of the pad or seam to be sewed, as shown in Fig. 3, at which point the gripping fingers reach down and lift the edges of the pad, as shown in Fig. 5, at which time such edges are penetrated by the needle, whereupon the first stitch is formed in conjunction with the chaining tongue or finger as hereinbefore described, while the sewing machine head is fed forward intermittently step by step, the stitches being spaced apart at an equal distance. The edges of the seam are gradually picked up and sewed while the preceding stitches placed in the work and around the chaining finger or tongue gradually drop therefrom owing to the shape of such chaining finger. These movements are continued until the sewing and gripping mechanism has been fed entirely across the pad to the opposite edge thereof, at which time another series of stitches is formed around the chaining tongue for a considerable distance, so that the thread may be severed in any suitable manner. Thus an end stitch chain is left at the starting and finishing side of the work to prevent the same from raveling, and at the same time a series of stitches is left around the chaining tongue to prevent the needle becoming unthreaded. The thread is intended to be severed just prior to the sewing machine head reaching the end of its movement, at which time the feed roll is disengaged from the feed wheel in the manner hereinbefore described and the sewing machine head automatically returned backward to its starting position, whereupon the conveyer is started in the manner described to deliver the sewed pad from the machine and deliver another one thereto.

The pads are intended to be placed on the conveyer at a relative distance, which may be designated by colored lines or other suitable marking extending transversely of the belt, by one attendant, while the sewing machine operator may be seated in front of the machine in position to start and stop the same and sever the thread after the pad has been stitched, and to assist in accurately positioning the pad opening in alinement with the stitching mechanism. As the sewing machine head again starts forward to stitch the next pad the projection 194, see Fig. 8, which, as hereinbefore stated, is a part of the sewing machine head and travels therewith, contacts with the back of the latch 195 so as to cause the same to swing on its pivot and overcome the action of the flat spring 197 secured to the bell crank lever 196. Thus the latch 195 swings to a position out of the path of travel of the projection 194 so as to enable the same to pass, after which it is returned to its position by its spring 197 and into position to be engaged by the projection 194 on the backward movement of the sewing machine head, thereby to again start the conveyer.

From the foregoing it will be understood that by adjusting the block carrying this projection 194, see Fig. 8, the time at which the projection 194 will operate the latch may be regulated, thereby to cause the conveyer to be operated at the desired time.

The machine is provided with a table 225 of any suitable material secured to cross pieces 226, see Figs. 1 and 4, supported at the front thereof by suitable posts 227, the rear thereof being supported by two adjustable angle brackets 228, see Fig. 1, secured to the standards or uprights 1 and 2. The top of this table is provided with a longitudinally extending slot 229 extending from end to end, in which the buttons or projections of the belt travel, thus permitting the conveyer belt to lie flat on the top surface of the table. The front portion of the table is cut out semi-circularly, as at 230, to permit the operator to be close to the stitching mechanism. The cutting out of the table also forms elbow rests 232 for the operator at each side of the cut out portion.

Attached to the front and rear of the table is a pair of adjustable work guides 233 and 234, each being secured in position by right angle brackets 235 having elongated slots 236 through which pass wing nuts 237 for securing the same in position. The front portion of the guide 233 is cut out on the bottom so that it may be adjusted over the top of the conveyer belt and yet not create friction on the latter, but permit it to pass freely thereunder.

The machine, during the stitching operation, operates at considerable speed, which may detract the attention of the operator from the work, and to prevent this as much as possible a suitable swinging cover 240 is hinged at 241 to the tie-bolt 6 at the top of the standards 1 and 2. This cover is provided with ears 243 adapted to rest against the ends of the overhanging portions of the standards 1 and 2 and may be clamped against the same by suitable clamps 244 pivotally secured to the standards. These clamps are provided with wing screws 245, which may be tightened against the ears and thus hold the cover securely against the standards 1 and 2. By loosening the wing screws and swinging the clamps downward the cover may be lifted and swung on its hinge back on the standards and out of position, thereby to enable adjustments and the threading of the stitching mechanism. This swinging cover, it will be observed, hangs down over the front ends of the standards in a manner which will be readily understood.

In operation the pads or articles to be sewed are placed on the conveyer at the left of the machine, with the opening to be sewed on top. The length of this conveyer is equal to the number of the articles placed end to end, so that several articles are placed in position on the conveyer ready to be delivered to the stitching mechanism and several on the conveyer that have been stitched, so that the pads are being continuously conveyed to and from the sewing mechanism, and, as hereinbefore stated, the driving conveyer drum is of such diameter that its circumference is equal to the longest article to be conveyed, so that one revolution thereof conveys each article to be conveyed its own length at each movement of the conveyer.

From the foregoing it will also be observed that by pressing on the toe of the foot treadle in the proper manner the clutch box shown in Fig. 40 will be shifted along the track to have the clutch shifter carried thereby move the shiftable clutch member of the hand wheel clutch carried by the sewing machine head and so start the sewing machine mechanism as hereinbefore described, and that by pressing on the heel of the foot treadle the clutch members will be disengaged and the sewing machine stopped.

I claim as my invention:

1. In a pad sewing machine, the combination of pad conveying means, means for automatically operating it thereby to carry a pad into position to be stitched, stopping it in such position during the entire sewing operation on the pad and carrying it away therefrom on the discontinuance of the sewing operation, supporting means and sewing mechanism supported thereon for reciprocatory movement across the path of travel of the pad, means for causing the sewing mechanism to produce a sewing operation on the pad when the pad is in its stopped position and to thereafter discontinue such operation, and means for automatically and continuously advancing and then returning said sewing mechanism.

2. In a pad sewing machine, the combination of pad conveying means, means for automatically operating it thereby to carry a pad into position to be stitched and away therefrom, supporting means and sewing mechanism supported thereon for reciprocatory movement across the path of travel of the pad, and means for automatically advancing and returning said sewing mechanism, said advancing means comprising a feed wheel and feed roll in engagement.

3. In a pad sewing machine, the combination of pad conveying means, means for automatically operating it thereby to carry a pad into position to be stitched, stopping it in such position during the entire sewing operation on the pad and carrying it away therefrom on the discontinuance of the sewing operation, supporting means and sewing mechanism supported thereon for reciprocatory movement across the path of travel of the pad, means for causing the sewing mechanism to produce a sewing operation on the pad when the pad is in its stopped position and to thereafter discontinue such operation, and means for automatically advancing and returning said sewing mechanism, said returning means comprising a weighted means.

4. In a pad sewing machine, the combination of pad conveying means, means for automatically operating it thereby to carry a pad into position to be stitched and away therefrom, supporting means and sewing mechanism supported thereon for reciprocatory movement across the path of travel of the pad, and means for automatically advancing and returning said sewing mechanism, said advancing means comprising a feed wheel and a feed roll in engagement and said returning means comprising a weighted means.

5. In a pad sewing machine, the combination of pad conveying means, means for automatically operating it thereby to carry a pad into position to be stitched and away therefrom, supporting means and sewing mechanism supported thereon for reciprocatory movement across the path of travel of the pad, means for automatically advancing and returning said sewing mechanism, said advancing means comprising a feed wheel and a feed roll, and means for disconnecting the feed wheel and feed roll after the stitching operation is completed.

6. In a pad sewing machine, the combination of pad conveying means, means for automatically operating it thereby to carry a pad into position to be stitched and away therefrom, supporting means and sewing machine mechanism supported thereon for reciprocatory movement across the path of travel of the pad, means for automatically advancing and returning said sewing machine mechanism, said advancing means comprising a feed wheel and a feed roll, and means for disconnecting the feed wheel and feed roll after the stitching operation is completed and comprising a swinging frame carrying the feed roll.

7. In a pad sewing machine, the combination of pad conveying means, means for automatically operating it thereby to carry a pad into position to be stitched and away therefrom, supporting means and sewing machine mechanism supported thereon for reciprocatory movement across the path of travel of the pad, means for automatically advancing and returning said sewing machine mechanism, said advancing means comprising a feed wheel and a feed roll, means for disconnecting the feed wheel and feed roll after the stitching operation is completed, and means for maintaining the feed roll out of engagement with the feed wheel during the return of the sewing machine mechanism to its starting position.

8. In a pad sewing machine, the combination of pad conveying means, means for automatically operating it thereby to carry a pad into position to be stitched and away therefrom, supporting means and sewing machine mechanism supported thereon for reciprocatory movement across the path of travel of the pad, means for automatically advancing and returning said sewing machine mechanism, said advancing means comprising a feed wheel and a feed roll, means for disconnecting the feed wheel and feed roll after the stitching operation is completed and comprising a swinging frame carrying the feed roll, and means for maintaining the feed roll out of engagement with the feed wheel during the return of the sewing machine mechanism to its starting position.

9. In a pad sewing machine, the combination of conveying means for advancing a pad into position to be sewed, stopping it in such position during the entire sewing operation on the pad and carrying it away therefrom on the discontinuance of the sewing operation, supporting means and a sewing mechanism carried thereby for to and fro movement across the path of travel of the pad, means for automatically feeding the sewing mechanism step by step across the path of travel of the pad, and means for causing the sewing mechanism to produce a sewing operation on the pad and to thereafter discontinue such operation.

10. In a pad sewing machine, the combination of conveying means for advancing a pad into position to be sewed and for carrying the same away from such position, supporting means and a sewing mechanism carried thereby for to and fro movement across the path of travel of the pad, and means for automatically feeding the sewing mechanism step by step across the path of travel of the pad and comprising a feed wheel shiftable with the sewing mechanism and a feed roll carried by the supporting means and in engagement with the feed wheel.

11. In a pad sewing machine, the combination of conveying means for advancing a pad into position to be sewed and for carrying the same away from such position, supporting means, a sewing machine mechanism carried thereby for to and fro movement across the path of travel of the pad, and means for automatically feeding the sewing machine mechanism step by step across the path of travel of the pad and comprising a feed wheel shiftable with the sewing machine mechanism and a feed roll carried by the supporting means and shiftable into and out of engagement with the feed wheel.

12. In a pad sewing machine, the combination of conveying means for advancing a pad into position to be sewed and for carrying the same away from such position, supporting means, a sewing machine mechanism carried thereby for to and fro movement across the path of travel of the pad, and means for automatically feeding the sewing machine mechanism step by step across the path of travel of the pad and comprising a feed wheel shiftable with the sewing machine mechanism and a feed roll carried by the supporting means and shiftable into and out of engagement with the feed wheel at a predetermined time by such feed wheel.

13. In a pad sewing machine, the combination of conveying means for advancing a pad into position to be sewed and for carrying the same away from such position, supporting means, a sewing machine mechanism carried thereby for to and fro movement across the path of travel of the pad, means for automatically feeding the sewing machine mechanism step by step across the path of travel of the pad and comprising a feed wheel shiftable with the sewing machine mechanism and a feed roll carried by the supporting means and shiftable into and out of engagement with the feed wheel at a predetermined time by such feed wheel, and means for maintaining such disengagement during the return of the sewing machine mechanism to its starting position.

14. In a pad sewing machine, the combination of conveying means for advancing a pad into position to be sewed and for carrying the same away from such position, supporting means, a sewing mechanism carried thereby for to and fro movement across the path of travel of the pad, means for automatically feeding the sewing mechanism step by step across the path of travel of the pad and comprising a feed wheel shiftable with the sewing mechanism and a feed roll carried by the supporting means and shiftable into and out of engagement with the feed wheels at a predetermined time and means operative during the return of such sewing mechanism to its starting position to effect a reëngagement of such feed roll and feed wheel thereby to advance the sewing mechanism.

15. In a pad sewing machine, the combination of conveying means for advancing a pad into position to be sewed and for carrying the same away from such position, supporting means, a sewing machine mechanism carried thereby for to and fro movement across the path of travel of the pad, means for automatically feeding the sewing machine mechanism step by step across the path of travel of the pad and comprising a feed wheel shiftable with the sewing machine mechanism and a feed roll carried by the supporting means and shiftable out of engagement with the feed wheel at a predetermined time by such feed wheel, means for maintaining such disengagement during the return of the sewing machine mechanism to its starting position, and means operated by the sewing machine mechanism during the return thereof to its starting position to permit a reëngagement of the feed wheel and feed roll.

16. In a pad sewing machine, the combination of conveying means for advancing a pad into position to be sewed and for carrying the same away from such position, supporting means, a sewing machine mechanism carried thereby for to and fro movement across the path of travel of the pad, means for automatically feeding the sewing machine mechanism step by step across the path of travel of the pad and comprising a feed wheel shiftable with the sewing machine mechanism and a feed roll carried by the supporting means and shiftable out of engagement with the feed wheel at a predetermined time by such feed wheel, means for maintaining such disengagement during the return of the sewing machine mechanism to its starting position, and means operated by the sewing machine mechanism during the return thereof to its starting position to permit a reëngagement of the feed wheel and feed roll and comprising a spring tensioned sliding rod and a pin carried by the sewing machine mechanism for engaging said rod at a predetermined time.

17. In a pad sewing machine, the combination of conveying means for advancing a pad into position to be sewed, stopping it in such position during the entire sewing operation on the pad and carrying it away therefrom on the discontinuance of the sewing operation, supporting means, sewing mechanism carried thereby for to and fro movement across the path of travel of the pad, means for automatically feeding the sewing mechanism step by step across the path of travel of the pad, weighted means for returning the sewing mechanism automatically to its starting position, and means for causing the sewing mechanism to produce a sewing operation on the pad and to thereafter discontinue such operation.

18. In a pad sewing machine, the combination of conveying means for advancing a pad into position to be sewed and for carrying the same away from such position, supporting means, sewing machine mechanism carried thereby for to and fro movement across the path of travel of the pad, means for automatically feeding the sewing machine mechanism step by step across the path of travel of the pad and comprising a feed wheel shiftable with the sewing machine mechanism and a feed roll carried by the supporting means and shiftable out of engagement with the feed wheel at a predetermined time by such feed wheel, means for maintaining such disengagement during the return of the sewing machine mechanism to its starting position, means operated by the sewing machine mechanism during the return thereof to its starting position to permit a reëngagement of the feed wheel and feed roll, and weighted means for returning the sewing machine mechanism automatically to its starting position.

19. In a pad sewing machine, the combination of conveying means for advancing a pad into position to be sewed and for carrying it away from such position, supporting means, a sewing machine mechanism carried thereby for to and fro movement across the path of travel of the pad, means for automatically feeding the sewing machine mechanism step by step across the path of travel of the pad and comprising a feed wheel shiftable with the sewing machine mechanism and a feed roll carried by the supporting means and shiftable out of engagement with the feed wheel at a predetermined time by such feed wheel, means for maintaining such disengagement during the return of the sewing machine mechanism to its starting position, means operated by the sewing machine mechanism during the return thereof to its starting position to permit a reëngagement of the feed wheel and feed roll and comprising a spring tensioned sliding rod and a pin carried by the sewing machine mechanism for engaging said rod at a predetermined time, and weighted means for returning the sewing machine mechanism automatically to its starting position.

20. In a pad sewing machine, the combination of pad conveying means, means for automatically operating it thereby to carry a pad into position to be stitched and away therefrom, supporting means, a shiftable sewing machine head supported thereon for reciprocatory movement across the path of travel of the pad, stitch forming mechanism carried by said head and including gripping means for lifting the work to the needle and a looper, and means for automatically advancing and returning said shiftable sewing machine head.

21. In a pad sewing machine, the combination of pad conveying means, means for automatically operating it thereby to carry a pad into position to be stitched and away therefrom, supporting means, a shiftable sewing machine head supported thereon for reciprocatory movement across the path of travel of the pad, stitch forming mechanism carried by said head and including gripping means and a needle, a looper having a step over movement, an oscillating movement and a swinging movement, and means for automatically advancing and returning said shiftable sewing machine head.

22. In a pad sewing machine, the combination of pad conveying means, means for automatically operating it thereby to carry a pad into position to be stitched and away therefrom, supporting means, a shiftable sewing machine head supported thereon for reciprocatory movement across the path of travel of the pad, stitch forming mechanism carried by said head and including gripping means, a needle and a stitch forming finger, a looper having a step over movement, an oscillating movement and a swinging movement, and means for automatically advancing and returning said shiftable sewing machine head.

23. In a pad sewing machine, the combination of conveying means for advancing a pad into position to be sewed and for carrying the same away from the sewing mechanism, supporting means, a sewing mechanism carried thereby for to and fro movement across the path of travel of the pad, means for automatically feeding the sewing mechanism across the path of travel of the pad, means for automatically returning the sewing mechanism to its starting position, and means for automatically starting the conveying mechanism during the return of the sewing mechanism to its starting position.

24. In a pad sewing machine, the combination of conveying means for advancing a pad into position to be sewed and for carrying the same away from the sewing mechanism, supporting means, a sewing mechanism carried thereby for to and fro movement step by step across the path of travel of the pad, means for automatically feeding the sewing mechanism across the path of travel of the pad, means for automatically returning the sewing mechanism to its starting position, and means for automatically starting the conveying mechanism during the return of the sewing mechanism to its starting position.

25. In a pad sewing machine, the combination of conveying means for automatically advancing the pad into position to be sewed, a sewing machine head carrying stitching mechanism and supported for advancing movement step by step across the path of travel of the pad, means for automatically feeding the head, means for automatically returning the head to its initial position, and adjustable means carried by the head for automatically controlling the starting of the conveying mechanism during the return of the head to its starting position.

26. In a sewing machine of the class described, the combination of work supporting means, a traveling head carrying stitching mechanism, and means for automatically feeding the head across the work and comprising a feed roll and a feed wheel, one movable with the head and the other having a fixed position relatively to such head and one having a projection and the other grooves for the reception of said projection.

27. In a sewing machine of the class described, the combination of work supporting means, a traveling head carrying stitching mechanism, means for automatically feeding the head across the work and comprising a feed roll and a feed wheel, one movable with the head and the other having a fixed position relatively to such head and one having a projection and the other grooves for the reception of said projection, and means for disengaging the feed wheel and roll at a predetermined period.

28. In a sewing machine of the class described, the combination of work supporting means, a traveling head carrying stitching mechanism, means for automatically feeding the head across the work and comprising a feed roll and a feed wheel, one movable with the head and the other having a fixed position relatively to such head and one having a projection and the other grooves for the reception of said projection, means for disengaging the feed wheel and roll at a predetermined period, means for automatically returning the head to its starting position, and means for maintaining the roll and wheel out of engagement during the return of the head to its starting position.

29. In a sewing machine of the class described, the combination of work supporting means, a traveling head carrying stitching mechanism, means for automatically feeding the head across the work and comprising a feed roll and a feed wheel, one movable with the head and the other having a fixed position relatively to such head and one having a projection and the other grooves for the reception of said projection, means for disengaging the feed wheel and roll at a predetermined period, means for automatically returning the head to its starting position, means for maintaining the roll and wheel out of engagement during the return of the head to its starting position, and means for throwing the stitching mechanism into and out of operation.

30. In a sewing machine of the class described, the combination of work supporting means, a traveling head carrying stitching mechanism, means for automatically feeding the head across the work and comprising a feed roll and a feed wheel, one movable with the head and the other having a fixed position relatively to such head and one having a projection and the other grooves for the reception of said projection, means for disengaging the feed wheel and roll at a predetermined period, means for automatically returning the head to its starting position, means for maintaining the roll and wheel out of engagement during the return of the head to its starting position, and means for throwing the stitching mechanism into and out of operation and comprising both a pedally and a manually operated mechanism.

31. In a sewing machine of the class described, the combination of work supporting means, a traveling head carrying stitching mechanism, means for automatically feeding the head across the work and comprising a feed roll and a feed wheel, one movable with the head and the other having a fixed position relatively to such head and one having a projection and the other grooves for the reception of said projection, and means for disengaging the feed wheel and roll at a predetermined period and comprising an eccentric disk carried by one of said feeding members for engagement with the other.

32. In a sewing machine of the class described, the combination of work supporting means, a traveling head carrying stitching mechanism, means for automatically feeding the head across the work and comprising a feed roll and a feed wheel, one movable with the head and the other having a fixed position relatively to such head and one having a projection and the other grooves for the reception of said projection, and means for disengaging the feed wheel and roll at a predetermined period and comprising an eccentric disk carried by the feed roll for engagement by the feed wheel at the end of the forward feeding of the head.

33. In a sewing machine of the class described, the combination of work supporting means, a traveling head carrying stitching mechanism, means for automatically feeding the head across the work and comprising a feed roll and a feed wheel, one movable with the head and the other having a fixed position relatively to such head and one having a projection and the other grooves for the reception of said projection, means for disengaging the feed wheel and roll at a predetermined period, means for automatically returning the head to its starting position, and means for maintaining the roll and wheel out of engagement during the return of the head to its starting position and operated by the head on the return thereof to its starting position to permit the re-engagement of the feed roll and wheel.

34. In a sewing machine of the class described, the combination of work supporting means, a traveling head carrying stitching mechanism, means for automatically feeding the head across the work and comprising a feed roll and a feed wheel, one movable with the head and the other having a fixed position relatively to such head, a swinging frame for supporting the feeding member which is stationary with relation to the head, and means for raising said swinging frame thereby to disengage the feed roll and wheel at a predetermined time.

35. In a sewing machine of the class described, the combination of work supporting means, a traveling head carrying stitching mechanism, means for automatically feeding the head across the work and comprising a feed roll and a feed wheel, one movable with the head and the other having a fixed position relatively to such head, a swinging frame for supporting the feeding member which is stationary with relation to the head, means for raising said swinging frame thereby to disengage the feed roll and wheel at a predetermined time, and means for regulating the position of said swinging frame and thereby the feeding member carried thereby.

36. In a sewing machine of the class described, the combination of work supporting means, a traveling head carrying stitching mechanism, means for automatically feeding the head across the work and comprising a feed roll and a feed wheel, one movable with the head and the other having a fixed position relatively to such head, a swinging frame for supporting the feeding member which is stationary with relation to the head, means for raising said swinging frame thereby to disengage the feed roll and wheel at a predetermined time, and means for holding said swinging frame in its raised position during the return of the head to its starting position.

37. In a sewing machine of the class described, the combination of work supporting means, a traveling head carrying stitching mechanism, means for automatically feeding the head across the work and comprising a feed roll and a feed wheel, one movable with the head and the other having a fixed position relatively to such head, a swinging frame for supporting the feeding member which is stationary with relation to the head, means for raising said swinging frame thereby to disengage the feed roll and wheel at a predetermined time, and means for holding said swinging frame in its raised position during the return of the head to its starting position and comprising a spring actuated rod.

38. In a sewing machine of the class described, the combination of work supporting means, a traveling head carrying stitching mechanism, means for automatically feeding the head across the work and comprising a feed roll and a feed wheel, one movable with the head and the other having a fixed position relatively to such head, a swinging frame for supporting the feeding member which is stationary with relation to the head, means for raising said swinging frame thereby to disengage the feed roll and wheel at a predetermined time, and means for holding said swinging frame in its raised position during the return of the head to its starting position and comprising a spring actuated rod shiftable by the head on the return thereof to its starting position to permit the lowering of the swinging frame.

39. In a sewing machine of the class described, the combination of work conveying means, means for automatically operating it thereby to carry the work into position to be stitched, a traveling sewing machine head movable across the work and carrying stitching mechanism, means for automatically feeding said head across the work step by step and comprising a feed wheel and a feed roll, one carried by the head and movable therewith and the other having a fixed position relatively to said head, means for disengaging said feeding members at the end of the feeding movement of the head, means for automatically returning the head to its starting position, and means for maintaining the feed roll and feed wheel out of engagement during such return and comprising a spring actuated rod.

40. In a sewing machine of the class described, the combination of work conveying means, means for automatically operating it thereby to carry the work into position to be stitched, a traveling sewing machine head movable across the work and carrying stitching mechanism, means for automatically feeding said head across the work step by step and comprising a feed wheel and a feed roll, one carried by the head and movable therewith and the other having a fixed position relatively to said head, means for disengaging said feeding members at the end of the feeding movement of the head, means for automatically returning the head to its starting position, means for maintaining the feed roll and feed wheel out of engagement during such return and comprising a spring actuated rod, and means shifted by the head on its return movement to actuate the rod and permit the reëngagement of the feed roll and feed wheel.

41. In a sewing machine of the class described, the combination of work conveying means, means for automatically operating it thereby to carry the work into position to be stitched, a traveling sewing machine head movable across the work and carrying stitching mechanism, means for automatically feeding said head across the work step by step and comprising a feed wheel and a feed roll, one carried by the head and movable therewith and the other having a fixed position relatively to said head, means for disengaging said feeding members at the end of the feeding movement of the head, means for automatically returning the head to its starting position, means for maintaining the feed roll and feed wheel out of engagement during such return and comprising a spring actuated rod, means shifted by the head on its return movement to actuate the rod and permit the reëngagement of the feed roll and feed wheel, and means operated by the head for starting the conveying means.

42. In a sewing machine of the class described, the combination of work conveying means, means for automatically operating it thereby to carry the work into position to be stitched, a traveling sewing machine head movable across the work and carrying stitching mechanism, means for automatically feeding said head across the work step by step and comprising a feed wheel and a feed roll, one carried by the head and movable therewith and the other having a fixed position relatively to said head, means for disengaging said feeding members at the end of the feeding movement of the head, means for automatically returning the head to its starting position, means for maintaining the feed roll and feed wheel out of engagement during such return, and means operated by the head on the return thereof to its starting position to automatically start the conveying mechanism.

43. In a sewing machine of the class described, the combination of work supporting means, a traveling sewing machine head carrying stitching mechanism, means for feeding the head transversely across the work supporting means and comprising a swingingly supported feed roll having at its outer end an eccentric portion, and a feed wheel carried by the head for engagement with the feed roll thereby to feed the head forward step by step across the work, the said eccentric portion and feed wheel coöperating at the end of the feeding movement of the head to raise the feed roll away from the feed wheel.

44. In a sewing machine of the class described, the combination of work supporting means, a traveling sewing machine head carrying stitching mechanism, means for feeding the head transversely across the work supporting means and comprising a swingingly supported feed roll having at its outer end an eccentric portion, a feed wheel carried by the head for engagement with the feed roll thereby to feed the head forward step by step across the work, the said eccentric portion and feed wheel coöperating at the end of the feeding movement of the head to raise the feed roll away from the feed wheel, and means for maintaining such disengagement of the roll and wheel during the return of the head to its initial position.

45. In a sewing machine of the class described, the combination of work supporting means, a traveling sewing machine head carrying stitching mechanism, means for feeding the head transversely across the work supporting means and comprising a swingingly supported feed roll having at its outer end an eccentric portion, a feed wheel carried by the head for engagement with the feed roll thereby to feed the head forward step by step across the work, the said eccentric portion and feed wheel coöperating at the end of the feeding movement of the head to raise the feed roll away from the feed wheel, means for maintaining such disengagement of the roll and wheel during the return of the head to its initial position, and means for automatically returning such head to its initial position.

46. In a sewing machine of the class described, the combination of work supporting means, a traveling sewing machine head carrying stitching mechanism, means for feeding the head transversely across the work supporting means and comprising a swingingly supported feed roll having at its outer end an eccentric portion, a feed wheel carried by the head for engagement with the feed roll thereby to feed the head forward step by step across the work, the said eccentric portion and feed wheel coöperating at the end of the feeding movement of the head to raise the feed roll away from the feed wheel, means for maintaining such disengagement of the roll and wheel during the return of the head to its initial position, means for automatically returning such head to its initial position, and means operated by the head to permit a reëngagement of the feed roll and wheel.

47. In a sewing machine of the class described, the combination of work supporting means, a traveling sewing machine head carrying stitching mechanism, means for feeding the head transversely across the work supporting means and comprising a swingingly supported feed roll having at its outer end an eccentric portion, a feed wheel carried by the head for engagement with the feed roll thereby to feed the head forward step by step across the work, the said eccentric portion and feed wheel coöperating at the end of the feeding movement of the head to raise the feed roll away from the feed wheel, means for maintaining such disengagement of the roll and wheel during the return of the head to its initial position, means for automatically returning such head to its initial position, means operated by the head to permit a reëngagement of the feed roll and wheel, and means for automatically operating the work supporting means.

48. In a sewing machine of the class described, the combination of work supporting means, a traveling sewing machine head carrying stitching mechanism, means for feeding the head transversely across the work supporting means and comprising a swingingly supported feed roll having at its outer end an eccentric portion, a feed wheel carried by the head for engagement with the feed roll thereby to feed the head forward step by step across the work, the said eccentric portion and feed wheel coöperating at the end of the feeding movement of the head to raise the feed roll away from the feed wheel, means for maintaining such disengagement of the roll and wheel during the return of the head to its initial position, means for automatically returning such head to its initial position, means operated by the head to permit a reëngagement of the feed roll and wheel, and means operated by the head during the return movement thereof for starting the work supporting means.

49. In a sewing machine of the class described, the combination of supporting means, conveying means for advancing the work into position to be sewed, stopping it in such position during the entire sewing operation on the work and then carrying the same away from such position, a sewing machine head carrying stitching mechanism and supported for traveling movement across the path of travel of the work, means for automatically feeding the head across the path of travel of the work step by step, means for automatically returning the head to its initial position, and means thrown into operation by the head during the return thereof to its initial position to automatically start the conveying mechanism.

50. In a sewing machine of the class described, the combination of supporting means, conveying means for advancing the work into position to be sewed and for carrying the same away from such position, a sewing machine head carrying stitching mechanism and supported for traveling movement across the path of travel of the work, means for automatically feeding the head across the path of travel of the work step by step, means for automatically returning the head to its initial position, means thrown into operation by the head during the return thereof to its initial position to automatically start the conveying mechanism, and means for throwing the stitching mechanism into and out of operation.

51. In a sewing machine of the class described, the combination of supporting means, conveying means for advancing the work into position to be sewed and for carrying the same away from such position, a sewing machine head carrying stitching mechanism and supported for traveling movement across the path of travel of the work, means for automatically feeding the head across the path of travel of the work step by step, means for automatically returning the head to its initial position, means thrown into operation by the head during the return thereof to its initial position to automatically start the conveying mechanism, and means for throwing the stitching mechanism into and out of operation and comprising pedally and manually operated mechanisms.

52. In a sewing machine of the class described, the combination of conveying means for advancing the work into position to be sewed, a sewing machine head supported for movement across the path of travel of the work and carrying stitching mechanism, means for automatically feeding the head across the path of travel of the work, means for automatically returning the head to its initial position, means for automatically starting the conveying mechanism during the return of the head to its initial position, and means for throwing the stitching mechanism into and out of operation.

53. In a sewing machine of the class described, the combination of conveying means for advancing the work into position to be sewed, a sewing machine head supported for movement across the path of travel of the work and carrying stitching mechanism, means for automatically feeding the head across the path of travel of the work, means for automatically returning the head to its initial position, means for automatically starting the conveying mechanism during the return of the head to its initial position, and means for throwing the stitching mechanism into and out of operation and comprising pedally and manually operated mechanisms.

54. In a sewing machine of the class described, the combination of work supporting means, a sewing machine head supported for feeding movement across the work and carrying stitching mechanism, means for automatically feeding the head across the work, means for automatically returning the head to its initial position, and means automatically operative during the return of such head to stop the stitching mechanism.

55. In a sewing machine of the class described, the combination of conveying means for advancing the work into position to be sewed, a sewing machine head supported for movement across the path of travel of the work and carrying stitching mechanism, feeding mechanism for automatically feeding the head across the path of travel of the work, means for automatically returning the head to its initial position, means automatically operative during the return of such head for stopping the stitching mechanism, and means for automatically starting the conveying mechanism during the return of the head to its starting position.

56. In a sewing machine of the class described, the combination of conveying means for advancing the work into position to be sewed, a sewing machine head supported for movement across the path of travel of the work and carrying stitching mechanism, feeding mechanism for automatically feeding the head across the path of travel of the work, means for automatically returning the head to its initial position, means automatically operative during the return of such head for stopping the stitching mechanism, means for automatically starting the conveying mechanism during the return of the head to its starting position, and means carried by the head for controlling the starting of such conveying mechanism.

57. In a sewing machine of the class described, the combination of conveying means for advancing the work into position to be sewed, a sewing machine head supported for movement across the path of travel of the work and carrying stitching mechanism, feeding mechanism for automatically feeding the head across the path of travel of the work, means for throwing the feeding mechanism out of operation to permit the head to be returned to its initial position, means for automatically returning the head to its initial position, means automatically operative during the return of such head for stopping the stitching mechanism, and means for automatically starting the conveying means during the return of the head to its initial position.

58. In a sewing machine of the class described, the combination of conveying means for advancing the work into position to be sewed, a sewing machine head supported for movement across the path of travel of the work and carrying stitching mechanism, feeding mechanism for automatically feeding the head across the path of travel of the work, means for throwing the feeding mechanism out of operation to permit the head to be returned to its initial position, means for maintaining said feeding mechanism out of operation during the return of the head to its initial position, means for automatically returning the head to its initial position, means automatically operative during the return of such head for stopping the stitching mechanism, and means for automatically starting the conveying means during the return of the head to its initial position.

59. In a sewing machine of the class described, the combination of conveying means for advancing the work into position to be sewed, a sewing machine head supported for movement across the path of travel of the work and carrying stitching mechanism, feeding mechanism for automatically feeding the head across the path of travel of the work, means for throwing the feeding mechanism out of operation to permit the head to be returned to its initial position, means for maintaining said feeding mechanism out of operation during the return of the head to its initial position and operated by the head during its return to permit the feeding mechanism to again feed the head forward, means for automatically returning the head to its initial position, means automatically operative during the return of such head for stopping the stitching mechanism, and means for automatically starting the conveying means during the return of the head to its initial position.

60. In a sewing machine of the class described, the combination of conveying means for advancing the work into position to be sewed, a sewing machine head supported for movement across the path of travel of the work and carrying stitching mechanism, feeding mechanism for automatically feeding the head across the path of travel of the work, means for throwing the feeding mechanism out of operation to permit the head to be returned to its initial position, means for maintaining said feeding mechanism out of operation during the return of the head to its initial position and operated by the head during its return to permit the feeding mechanism to again feed the head forward, means for controlling the driving of said feeding mechanism, means for automatically returning the head to its initial position, means automatically operative during the return of such head for stopping the stitching mechanism, and means for automatically starting the conveying means during the return of the head to its initial position.

61. In a sewing machine of the class described, the combination of conveying means for advancing the work into position to be sewed, a sewing machine head supported for movement across the path of travel of the work and carrying stitching mechanism, feeding mechanism for automatically feeding the head across the path of travel of the work, means for throwing the feeding mechanism out of operation to permit the head to be returned to its initial position, means for maintaining said feeding mechanism out of operation during the return of the head to its initial position and operated by the head during its return to permit the feeding mechanism to again feed the head forward, means for controlling the driving of said feeding mechanism and comprising manually and pedally operated means, means for automatically returning the head to its initial position, means automatically operative during the return of such head for stopping the stitching mechanism, and means for automatically starting the conveying means during the return of the head to its initial position.

62. In a sewing machine of the class described, the combination of conveying means for advancing the work into position to be sewed, a sewing machine head supported for movement across the path of travel of the work and carrying stitching mechanism, feeding mechanism for automatically feeding the head across the path of travel of the work, means for throwing the feeding mechanism out of operation to permit the return of the head to its initial position, means for automatically returning the head to its initial position, means for automatically starting the conveying mechanism during the return of the head to its initial position, and means for controlling the driving of the feeding mechanism.

63. In a sewing machine of the class described, the combination of conveying means for advancing the work into position to be sewed, a sewing machine head supported for movement across the path of travel of the work and carrying stitching mechanism, feeding mechanism for automatically feeding the head across the path of travel of the work, means for throwing the feeding mechanism out of operation to permit the return of the head to its initial position, means for automatically returning the head to its initial position, means for automatically starting the conveying mechanism during the return of the head to its initial position, and means for controlling the driving of the feeding mechanism and comprising clutch mechanism.

64. In a sewing machine of the class described, the combination of conveying means for advancing the work into position to be sewed, a sewing machine head supported for movement across the path of travel of the work and carrying stitching mechanism, feeding mechanism for automatically feeding the head across the path of travel of the work, means for throwing the feeding mechanism out of operation to permit the return of the head to its initial position, means for automatically returning the head to its initial position, means for automatically starting the conveying mechanism during the return of the head to its initial position, and means for controlling the driving of the feeding mechanism and comprising clutch mechanism and means under the control of the operator for controlling the operation of the clutch mechanism.

65. In a sewing machine of the class described, the combination of conveying means for advancing the work into position to be sewed, a sewing machine head supported for movement across the path of travel of the work and carrying stitching mechanism, feeding mechanism for automatically feeding the head across the path of travel of the work, means for throwing the feeding mechanism out of operation to permit the return of the head to its initial position, means for automatically returning the head to its initial position, means for automatically starting the conveying means during the return of the head to its initial position, and means for controlling the driving of the feeding mechanism and comprising clutch mechanism and means under the control of the operator for controlling the operation of the clutch mechanism, said clutch mechanism being also effective to control the operation of the stitching mechanism.

66. In a sewing machine of the class described, the combination of conveying means for advancing the work into position to be sewed, a sewing machine head supported for movement across the path of travel of the work and carrying stitching mechanism, feeding mechanism for automatically feeding the head across the path of travel of the work, means for throwing the feeding mechanism out of operation to permit the return of the head to its initial position, means for automatically returning the head to its initial position, means for automatically starting the conveying means during the return of the head to its initial position, means for controlling the driving of the feeding mechanism and comprising clutch mechanism, and means under the control of the operator for controlling the operation of the clutch mechanism, said clutch mechanism being also effective to control the operation of the stitching mechanism and means also automatically operative at one period to control the operation of such clutch mechanism and thereby the stitching mechanism.

67. In a sewing machine of the class described, the combination of conveying means for advancing the work into position to be sewed, a sewing machine head supported for movement across the path of travel of the work and carrying stitching mechanism, feeding mechanism for automatically feeding the head across the path of travel of the work, means for throwing the feeding mechanism out of operation to permit the return of the head to its initial position, means for automatically returning the head to its initial position, means carried by the head for automatically starting the conveying means during the return of the head to its initial position, and means for controlling the driving of the feeding mechanism.

68. In a sewing machine of the class described, the combination of conveying means for advancing the work into position to be sewed, a sewing machine head supported for movement across the path of travel of the work and carrying stitching mechanism, feeding mechanism for automatically feeding the head across the path of travel of the work, means for throwing the feeding mechanism out of operation to permit the return of the head to its initial position, means for automatically returning the head to its initial position, means carried by the head for automatically starting the conveying means during the return of the head to its initial position, means for controlling the driving of the feeding mechanism, means for maintaining the feeding mechanism out of operation during the return of the head to its initial position, and means operated by the head during such return for permitting the operation of the feeding mechanism.

69. In a sewing machine of the class described, the combination of conveying means for advancing a pad into position to be sewed, a sewing machine head carrying stitching mechanism and supported for movement across the path of travel of the pad, means for automatically feeding the head across the path of travel of the pad, means for automatically returning the head to its starting position, means for automatically starting the conveying means during the return of the head to its starting position, and means for automatically stopping the conveying means at a predetermined period.

70. In a sewing machine of the class described, the combination of conveying means for advancing a pad into position to be sewed and comprising a belt, a driving drum for advancing the belt, a sewing machine head supported for traveling movement transversely across the belt and carrying stitching mechanism, means for automatically feeding the head across the path of travel of the belt, means for automatically returning the head to its initial position, and means for automatically starting the belt during the return of the head to its initial position.

71. In a sewing machine of the class described, the combination of conveying means for advancing a pad into position to be sewed and comprising a belt, a driving drum for advancing the belt, a sewing machine head supported for traveling movement transversely across the belt and carrying stitching mechanism, means for automatically feeding the head across the path of travel of the belt, means for automatically returning the head to its initial position, and means thrown into operation by the head for automatically starting the belt during the return of the head to its initial position.

72. In a sewing machine of the class described, the combination of conveying means for advancing a pad into position to be sewed and comprising a belt, a driving drum for advancing the belt, a sewing machine head supported for traveling movement transversely across the belt and carrying stitching mechanism, means for automatically feeding the head across the path of travel of the belt, means for automatically returning the head to its initial position, means for automatically starting the belt during the return of the head to its starting position, and means for stopping the belt at a predetermined period.

73. In a sewing machine of the class described, the combination of conveying means for advancing a pad into position to be sewed and comprising a belt, a driving drum for advancing the belt, a sewing machine head supported for traveling movement transversely across the belt and carrying stitching mechanism, means for automatically feeding the head across the path of travel of the belt, means for automatically returning the head to its initial position, means for automatically starting the belt during the return of the head to its initial position and means for stopping the belt on each complete revolution of the driving drum.

74. In a sewing machine of the class described, the combination of conveying means for advancing a pad into position to be sewed and comprising a belt, a driving drum for advancing the belt, a shaft carrying the drum, a driving pulley on the shaft, clutch mechanism on the shaft for controlling the rotation of the drum, a sewing machine head supported for traveling movement transversely across the belt and carrying stitching mechanism, means for automatically feeding the head across the path of travel of the belt, means for automatically returning the head to its initial position, and means for operating the clutch mechanism during the return of the head thereby to drive the drum.

75. In a sewing machine of the class described, the combination of conveying means for advancing a pad into position to be sewed and comprising a belt, a driving drum for advancing the belt, a shaft carrying the drum, a driving pulley on the shaft, clutch mechanism on the shaft for controlling the rotation of the drum, a sewing machine head supported for traveling movement transversely across the belt and carrying stitching mechanism, means for automatically feeding the head across the path of travel of the belt, means for automatically returning the head to its initial position, and means operated by the head for operating the clutch mechanism during the return of the head thereby to drive the drum.

76. In a sewing machine of the class described, the combination of conveying means for advancing a pad into position to be sewed and comprising a belt, a driving drum for advancing the belt, a shaft carrying the drum, a driving pulley on the shaft, clutch mechanism on the shaft for controlling the rotation of the drum, a sewing machine head supported for traveling movement transversely across the belt and carrying stitching mechanism, means for automatically feeding the head across the path of travel of the belt, means for automatically returning the head to its initial position, means for operating the clutch mechanism during the return of the head thereby to drive the drum, and means forming a part of the clutch mechanism for stopping the belt drum on each complete revolution thereof.

77. In a sewing machine of the class described, the combination of conveying means for advancing a pad into position to be sewed and comprising a belt, a driving drum for advancing the belt, a shaft carrying the drum, a driving pulley on the shaft, clutch mechanism on the shaft for controlling the rotation of the drum, a sewing machine head supported for traveling movement transversely across the belt and carrying stitching mechanism, means for automatically feeding the head across the path of travel of the belt, means for automatically returning the head to its initial position, means operated by the head for operating the clutch mechanism during the return of the head thereby to drive the drum, and means forming a part of the clutch mechanism for stopping the belt drum on each complete revolution thereof.

78. In a sewing machine of the class described, the combination of conveying means for advancing a pad into position to be sewed and comprising a belt, a driving drum for advancing the belt, a sewing machine head supported for traveling movement transversely across the belt and carrying stitching mechanism, means for automatically feeding the head across the path of travel of the belt, means for automatically returning the head to its initial position, means for automatically starting the belt during the return of the head to its initial position, and adjustable means for guiding the pad carried by the belt.

79. In a sewing machine of the class described, the combination of conveying means for advancing a pad into position to be sewed and comprising a belt, a driving drum for advancing the belt, a sewing machine head supported for traveling movement transversely across the belt and carrying stitching mechanism, means for automatically feeding the head across the path of travel of the belt, means for automatically returning the head to its initial position, means for automatically starting the belt during the return of the head to its initial position, a table over which said belt passes, and adjustable means located at each side of the belt for guiding the work.

80. In a sewing machine of the class described, the combination of conveying means for advancing a pad into position to be sewed and comprising an endless belt, a driving drum for advancing and supporting the belt at one end, an idle pulley for supporting it at the opposite end, said driving drum and belt having, one projections and the other openings for the reception thereof thereby to positively drive the belt, a sewing machine head supported for traveling movement transversely across the belt and carrying stitching mechanism, means for automatically feeding the head across the path of travel of the belt, means for automatically returning the head to its initial position, and means for automatically starting the belt during the return of the head to its initial position.

81. In a sewing machine of the class described, the combination of conveying means for advancing a pad into position to be sewed and comprising an endless belt, a driving drum for advancing and supporting the belt at one end, a pair of idle pulleys spaced apart for supporting the belt at its other end, said belt having projections and the driving drum having openings for the reception thereof thereby to positively drive the belt, a sewing machine head supported for traveling movement transversely across the belt and carrying stitching mechanism, means for automatically feeding the head across the path of travel of the belt, means for automatically returning the head to its initial position, and means for automatically starting the belt during the return of the head to its initial position.

82. In a sewing machine of the class described, the combination of conveying means for advancing a pad into position to be sewed and comprising an endless belt, a driving drum for advancing and supporting the belt at one end, a pair of idle pulleys spaced apart for supporting the belt at its other end, said belt having projections and the driving drum having openings for the reception thereof thereby to positively drive the belt, a sewing machine head supported for traveling movement transversely across the belt and carrying stitching mechanism, means for automatically feeding the head across the path of travel of the belt, means for automatically returning the head to its initial position, means for automatically starting the belt during the return of the head to its initial position, and a table over which said belt passes, said table having a longitudinal recess for the passage of the projections carried by the belt.

83. In a sewing machine of the class described, the combination of conveying means for advancing a pad into position to be sewed and comprising an endless belt, a driving drum for advancing and supporting the belt at one end, a pair of idle pulleys spaced apart for supporting the belt at its other end, said belt having projections and the driving drum having openings for the reception thereof thereby to positively drive the belt, a sewing machine head supported for traveling movement transversely across the belt and carrying stitching mechanism, means for automatically feeding the head across the path of travel of the belt, means for automatically returning the head to its initial position, means for automatically starting the belt during the return of the head to its initial position, a table over which said belt passes, said table having a longitudinal recess for the passage of the projections carried by the belt, and adjustable guiding means for the work located at each edge of the belt.

84. In a sewing machine of the class described, the combination of work supporting means, a sewing machine head carrying stitching mechanism and supported for traveling movement across the work, means for automatically feeding the head across the work, means for automatically returning it to its initial position, automatically operative means for rendering inoperative the stitching mechanism during the return of the head to its initial position, and means for moving the work transversely to the path of travel of the sewing machine head.

85. In a sewing machine of the class described, the combination of conveying means for automatically advancing a pad into position to be sewed, a sewing machine head carrying stitching mechanism and supported for traveling movement across the path of travel of the pad, means for automatically feeding the head across the path of travel of the pad, means for automatically returning it to its initial position, and means for rendering inoperative the stitching mechanism during the return of the head to its initial position.

86. In a sewing machine of the class described, the combination of conveying means for automatically advancing a pad into position to be sewed, a sewing machine head carrying stitching mechanism and supported for traveling movement across the path of travel of the pad, means for automatically feeding the head across the path of travel of the pad, means for automatically returning it to its initial position, and automatically operative means for rendering inoperative the stitching mechanism during the return of the head to its initial position.

87. In a sewing machine of the class described, the combination of conveying means for automatically advancing a pad into position to be sewed, a sewing machine head carrying stitching mechanism and supported for traveling movement across the path of travel of the pad, means for automatically feeding the head across the path of travel of the pad, means for automatically returning it to its initial position, automatically operative means for rendering inoperative the stitching mechanism during the return of the head to its initial position, and means for controlling the starting of such stitching mechanism.

88. In a sewing machine of the class described, the combination of conveying means for automatically advancing a pad into position to be sewed, a sewing machine head carrying stitching mechanism and supported for traveling movement across the path of travel of the pad, means for automatically feeding the head across the path of travel of the pad, means for automatically returning it to its initial position, automatically operative means for rendering inoperative the stitching mechanism during the return of the head to its initial position, and means for controlling the starting of such stitching mechanism and comprising manually and pedally operated mechanisms.

89. In a sewing machine of the class described, the combination of conveying means for advancing the pad into position to be sewed, a head carrying stitching mechanism and supported for movement across the path of travel of the pad, means for automatically feeding the head across the path of travel of the pad, means for automatically returning the head to its initial position, means for rendering inoperative the stitching mechanism during the return of the head to its initial position, and means for automatically throwing the pad conveying means into operation during the return of such head.

90. In a sewing machine of the class described, the combination of conveying means for advancing the pad into position to be sewed, a head carrying stitching mechanism and supported for movement across the path of travel of the pad, means for automatically feeding the head across the path of travel of the pad, means for automatically returning the head to its initial position, means for rendering inoperative the stitching mechanism during the return of the head to its initial position, means for automatically throwing the pad conveying means into operation during the return of such head, and means for throwing the feeding means out of operation during the return of such head to its initial position.

91. In a sewing machine of the class described, the combination of conveying means for advancing the pad into position to be sewed, a head carrying stitching mechanism and supported for movement across the path of travel of the pad, means for automatically feeding the head across the path of travel of the pad, means for automatically returning the head to its initial position, means for rendering inoperative the stitching mechanism during the return of the head to its initial position, means for automatically throwing the pad conveying means into operation during the return of such head, means for throwing the feeding means out of operation during the return of such head to its initial position, and means for maintaining it out of operation during the return of the head to its initial position.

92. In a sewing machine of the class described, the combination of conveying means for advancing a pad into position to be sewed, a head carrying stitching mechanism and supported for movement across the path of travel of the pad, means for automatically feeding the head across the path of travel of the pad, means for automatically returning the head to its initial position, means for rendering inoperative the stitching mechanism during the return of the head to its initial position, means for automatically throwing the pad conveying means into operation during the return of such head, means for throwing the feeding means out of operation during the return of such head to its initial position, means for maintaining it out of operation during such return of the head to its initial position, and means operated by the head during its return to its initial position to throw the feeding means into operation.

93. In a sewing machine of the class described, the combination of conveying means for advancing a pad into position to be sewed, a head carrying stitching mechanism and supported for movement across the path of travel of the pad, means for automatically feeding the head across the path of travel of the pad, means for automatically returning the head to its initial position, means for rendering inoperative the stitching mechanism during the return of the head to its initial position, means for automatically throwing the pad conveying means into operation during the return of such head, means for throwing the feeding means out of operation during the return of such head to its initial position, means for maintaining it out of operation during such return of the head to its initial position, means operated by the head during its return to its initial position to throw the feeding means into operation, and means for controlling the starting of the stitching mechanism.

94. In a sewing machine of the class described, the combination of conveying means for advancing a pad into position to be sewed, a head carrying stitching mechanism and supported for movement across the path of travel of the pad, means for automatically feeding the head across the path of travel of the pad, means for automatically returning the head to its initial position, means for rendering inoperative the stitching mechanism during the return of the head to its initial position, means for automatically throwing the pad conveying means into operation during the return of such head, means for throwing the feeding means out of operation during the return of such head to its initial position, means for maintaining it out of operation during such return of the head to its initial position, means operated by the head during its return to its initial position to throw the feeding means into operation, and means for controlling the starting of the stitching mechanism and comprising a pedally and a manually operated mechanism.

95. In a sewing machine of the class described, the combination of conveying means for advancing a pad into position to be sewed, a head carrying stitching mechanism and supported for movement across the path of travel of the pad, means for automatically feeding the head across the path of travel of the pad, means for automatically returning the head to its initial position, means for rendering inoperative the stitching mechanism during the return of the head to its initial position, means for automatically throwing the pad conveying means into operation during the return of such head, means for throwing the feeding means out of operation during the return of such head to its initial position, means for maintaining it out of operation during such return of the head to its initial position, means operated by the head during its re-return to its initial position to throw the feeding means into operation, means for controlling the starting of the stitching mechanism and comprising a pedally and a manually operated mechanism, and means for automatically stopping the conveying means at a predetermined period.

96. In a sewing machine of the class described, the combination of supporting means, conveying means for automatically conveying the work into position to be sewed and stopping it in such position during the entire sewing operation on the work, tracks carried by said supporting means, a sewing machine head mounted on said tracks for traveling movement across the path of travel of the work and carrying sewing mechanism, means for automatically feeding the head step by step across the work, means for automatically returning the head to its initial position, and means for operating the sewing mechanism during one movement of the sewing head and rendering said sewing mechanism inoperative on the work during the other or reverse movement of said head.

97. In a sewing machine of the class described, the combination of supporting means, means for automatically conveying the work into position to be sewed and stopping it in such position during the entire sewing operation on the work, tracks carried by said supporting means, a sewing machine head carrying sewing mechanism and having rolls in engagement with said tracks, some of which rolls are automatically adjustable thereby to maintain the head in its proper position, means for automatically feeding the head step by step across the path of travel of the conveying means, means for automatically returning the head to its initial position, and means for operating the sewing mechanism during one movement of the sewing head and rendering said sewing mechanism inoperative on the work during the other or reverse movement of said head.

98. In a sewing machine of the class described, the combination of supporting means, means for automatically conveying the work into position to be sewed, tracks carried by said supporting means, a sewing machine head carrying stitching mechanism and having rolls in engagement with said tracks, some of which rolls are automatically adjustable thereby to maintain the head in its proper position, means for automatically feeding the head step by step across the path of travel of the conveying means and comprising a feed wheel carried by the head, means for rotating it, and a feed roll in engagement with the wheel and swingingly supported by said supporting means.

99. In a sewing machine of the class described, the combination of supporting means, means for automatically conveying the work into position to be sewed, tracks carried by said supporting means, a sewing machine head carrying stitching mechanism and having rolls in engagement with said tracks, some of which rolls are automatically adjustable thereby to maintain the head in its proper position, means for automatically feeding the head step by step across the path of travel of the conveying means and comprising a feed wheel carried by the head, means for rotating it, a feed roll in engagement with the wheel and swingingly supported by said supporting means, and means for raising the roll out of engagement with the feed wheel at a predetermined period.

100. In a sewing machine of the class described, the combination of supporting means, means for automatically conveying the work into position to be sewed, tracks carried by said supporting means, a sewing machine head carrying stitching mechanism and having rolls in engagement with said tracks, some of which rolls are automatically adjustable thereby to maintain the head in its proper position, means for automatically feeding the head step by step across the path of travel of the conveying means and comprising a feed wheel carried by the head, means for rotating it, a feed roll in engagement with the wheel and swingingly supported by said supporting means, and means for raising the roll out of engagement with the feed wheel at a predetermined period and comprising an eccentric portion carried by the feed roll.

101. In a sewing machine of the class described, the combination of supporting means, means for automatically conveying the work into position to be sewed, tracks carried by said supporting means, a sewing machine head carrying stitching mechanism and having rolls in engagement with said tracks, some of which rolls are automatically adjustable thereby to maintain the head in its proper position, means for automatically feeding the head step by step across the path of travel of the conveying means and comprising a feed wheel carried by the head, means for rotating it, a feed roll in engagement with the wheel and swingingly supported by said supporting means, means for raising the roll out of engagement with the feed wheel at a predetermined period and comprising an eccentric portion carried by the feed roll, means for holding said feed roll in its raised position during the return of the head to its initial position, and weighted means for returning said head to its initial position.

102. In a sewing machine of the class described, the combination of supporting means, means for automatically conveying the work into position to be sewed, tracks carried by said supporting means, a sewing machine head carrying stitching mechanism and having rolls in engagement with said tracks, some of which rolls are automatically adjustable thereby to maintain the head in the proper position, means for automatically feeding the head step by step across the path of travel of the conveying means and comprising a feed wheel carried by the head, means for rotating it, a feed roll in engagement with the wheel and swingingly supported by said supporting means, means for raising the roll out of engagement with the feed wheel at a predetermined period and comprising an eccentric portion carried by the feed roll, means for holding said feed roll in its raised position during the return of the head to its initial position, weighted means for returning the head to its initial position, and means operated by the head during the return thereof for operating the feed roll holding means thereby to permit the reëngagement of the feed roll and feed wheel.

103. In a sewing machine of the class described, the combination of supporting means, means for automatically conveying the work into position to be sewed, tracks carried by said supporting means, a sewing machine head carrying stitching mechanism and having rolls in engagement with said tracks, some of which rolls are automatically adjustable thereby to maintain the head in the proper position, means for automatically feeding the head step by step across the path of travel of the conveying means and comprising a feed wheel carried by the head, means for rotating it, a feed roll in engagement with the wheel and swingingly supported by said supporting means, means for raising the roll out of engagement with the feed wheel at a predetermined period and comprising an eccentric portion carried by the feed roll, means for holding said feed roll in its raised position during the return of the head to its initial position, weighted means for returning the head to its initial position, means operated by the head during such return for operating the feed roll holding means thereby to permit the reengagement of the feed roll and feed wheel, and means also operated by the head during its return to start the conveying means.

104. In a sewing machine of the class described, the combination of work supporting means, a sewing machine head supported for movement across the work, means for automatically feeding the head across the work, means for automatically returning the head to its initial position, stitching mechanism carried by said head and comprising gripping mechanism effective to lift the work looper mechanism, needle mechanism and a chain forming means, means for operating the looper, needle and gripping mechanisms and including clutch mechanism, and means for controlling said clutch mechanism.

105. In a sewing machine of the class described, the combination of work supporting means, a sewing machine head supported for movement across the work, means for automatically feeding the head across the work, means for automatically returning the head to its initial position, stitching mechanism carried by said head and comprising gripping mechanism, looper mechanism, needle mechanism and a chain forming means, means for operating the looper, needle and gripping mechanisms effective to lift the work and including clutch mechanism, and means for controlling said clutch mechanism and effective at one period to automatically control the operation of the stitching mechanism.

106. In a sewing machine of the class described, the combination of work supporting means, a sewing machine head supported for movement across the work, means for automatically feeding the head across the work, means for automatically returning the head to its initial position, stitching mechanism carried by said head and comprising gripping mechanism, looper mechanism, needle mechanism and a chain forming means, means for operating the looper, needle and gripping mechanisms and including clutch mechanism, and means for controlling said clutch mechanism and effective at one period to automatically control the operation of the stitching mechanism, said clutch controlling means including manually and pedally operated means.

107. In a sewing machine of the class described, the combination of automatically operative conveying means for conveying the work into position to be sewed, a sewing machine head supported in position for traveling movement across the path of the conveying means, means for automatically feeding the head step by step across the path of travel of the conveying means, means for automatically returning the head to its initial position, stitching mechanism carried by said head, driving means including a driving shaft for the stitching mechanism, said shaft being shiftable with the head, and clutch mechanism effective to engage and disengage the driving means and the stitching mechanism.

108. In a sewing machine of the class described, the combination of automatically operative conveying means for conveying the work into position to be sewed, a sewing machine head supported in position for traveling movement across the path of the conveying means, means for automatically feeding the head step by step across the path of travel of the conveying means, means for automatically returning the head to its initial position, stitching mechanism carried by said head, driving means including a driving shaft for the stitching mechanism, said shaft being shiftable with the head, and clutch mechanism effective to engage and disengage the driving means and the stitching mechanism and also effective during the return of the head to its initial position to automatically disengage the stitching mechanism from the driving means.

109. In a sewing machine of the class described, the combination of automatically operative conveying means for conveying the work into position to be sewed, a sewing machine head supported in position for traveling movement across the path of the conveying means, means for automatically feeding the head step by step across the path of travel of the conveying means, means for automatically returning the head to its initial position, stitching mechanism carried by said head, driving means including a driving shaft for the stitching mechanism, said shaft being shiftable with the head, and clutch mechanism effective to engage and disengage the driving means and the stitching mechanism and also effective during the return of the head to its initial position to automatically disengage the stitching mechanism from the driving means, said stitching mechanism comprising needle mechanism, looper mechanism, gripping mechanism and chain forming means.

110. In a sewing machine of the class described, the combination of automatically operative conveying means for conveying the work into position to be sewed, a sewing machine head supported in position for traveling movement across the path of the conveying means, means for automatically feeding the head step by step across the path of travel of the conveying means, means for automatically returning the head to its initial position, stitching mechanism carried by said head, driving means including a driving shaft for the stitching mechanism, said shaft being shiftable with the head, clutch mechanism effective to engage and disengage the driving means and the stitching mechanism and also effective during the return of the head to its initial position to automatically disengage the stitching mechanism from the driving means, said stitching mechanism comprising needle mechanism, looper mechanism, gripping mechanism and chain forming means, and means for operating the gripping mechanism to grip the work at each side of an opening and raise, infold and close such opening simultaneously.

111. In a sewing machine of the class described, the combination of means for automatically conveying the work into position to be sewed, a sewing machine head supported for traveling movement across the path of travel of the conveying means, means for automatically feeding the head across the path of travel of such conveying means, means for automatically returning the head to its initial position, stitching mechanism carried by said head and including gripping means effective to grip the work at each side of an opening, raise, infold and close the same simultaneously, and means for operating the gripping mechanism.

112. In a sewing machine of the class described, the combination of means for automatically conveying the work into position to be sewed, a sewing machine head supported for traveling movement across the path of travel of the conveying means, means for automatically feeding the head across the path of travel of such conveying means, means for automatically returning the head to its initial position, stitching mechanism carried by said head and including gripping means comprising two pairs of gripping fingers effective to grip the work at each side of an opening, raise, infold and close the same simultaneously, and means for operating the gripping mechanism.

113. In a sewing machine of the class described, the combination of means for automatically conveying the work into position to be sewed, a sewing machine head supported for traveling movement across the path of travel of the conveying means, means for automatically feeding the head across the path of travel of such conveying means, means for automatically returning the head to its initial position, stitching mechanism carried by said head and including a looper having a swinging movement, an up and down movement and an oscillatory movement in a horizontal plane, gripping means effective to grip the work at each side of an opening, raise, infold and close the same simultaneously, and means for operating said mechanisms.

114. In a sewing machine of the class described, the combination of means for automatically conveying the work into position to be sewed, a sewing machine head supported for traveling movement across the path of travel of the conveying means, means for automatically feeding the head across the path of travel of such conveying means, means for automatically returning the head to its initial position, stitching mechanism carried by said head and including a two-pronged looper having a swinging movement, an up and down movement and an oscillatory movement in a horizontal plane, gripping mechanism effective to grip the work at each side of an opening, raise, infold and close the same simultaneously, and means for operating said mechanisms.

115. In a sewing machine of the class described, the combination of means for automatically conveying the work into position to be sewed, a sewing machine head supported for traveling movement across the path of travel of the conveying means, means for automatically feeding the head across the path of travel of such conveying means, means for automatically returning the head to its initial position, stitching mechanism carried by said head and comprising a horizontally supported needle, a chain forming finger, gripping mechanism effective to grip the work at each side of an opening, raise, infold and close the same, and looper mechanism including a looper having a swinging movement, an up and down movement and an oscillatory movement, and means for operating said stitching mechanism.

116. In a sewing machine of the class described, the combination of means for automatically conveying the work into position to be sewed, a sewing machine head supported for traveling movement across the path of travel of the conveying means, means for automatically feeding the head across the path of travel of such conveying means, means for automatically returning the head to its initial position, stitching mechanism carried by said head and comprising a horizontally supported needle, a chain forming finger, gripping mechanism effective to grip the work at each side of an opening, raise, infold and close the same, looper mechanism including a looper having a swinging movement, an up and down movement and an oscillatory movement, the latter in a horizontal plane, and means for operating said stitching mechanism.

117. In a sewing machine of the class described, the combination of means for automatically conveying the work into position to be sewed, a sewing machine head supported for traveling movement across the path of travel of the conveying means, means for automatically feeding the head across the path of travel of such conveying means, means for automatically returning the head to its initial position, stitching mechanism carried by said head and comprising a horizontally supported needle, a chain forming finger, gripping mechanism effective to grip the work at each side of an opening, raise, infold and close the same, looper mechanism including a looper having a swinging movement, an up and down movement and an oscillatory movement, the latter in a horizontal plane, and means for operating said stitching mechanism and including a driving shaft shiftable with the head.

118. In a sewing machine of the class described, the combination of means for automatically conveying the work into position to be sewed, a sewing machine head supported for traveling movement across the path of travel of the conveying means, means for automatically feeding the head across the path of travel of such conveying means, means for automatically returning the head to its initial position, stitching mechanism carried by said head and comprising a horizontally supported needle, a chain forming finger, gripping mechanism effective to grip the work at each side of an opening, raise, infold and close the same, looper mechanism including a looper having a swinging movement, an up and down movement and an oscillatory movement, the latter in a horizontal plane, means for operating said stitching mechanism, and clutch mechanism for making and breaking connection between the operating means and the stitching mechanism.

119. In a sewing machine of the class described, the combination of means for automatically conveying the work into position to be sewed, a sewing machine head supported for traveling movement across the path of travel of the conveying means, means for automatically feeding the head across the path of travel of such conveying means, means for automatically returning the head to its initial position, stitching mechanism carried by said head and comprising a horizontally supported needle, a chain forming finger, gripping mechanism effective to grip the work at each side of an opening, raise, infold and close the same, looper mechanism including a looper having a swinging movement, an up and down movement and an oscillatory movement, the latter in a horizontal plane, means for operating said stitching mechanism, clutch mechanism for making and breaking connection between the operating means and the stitching mechanism, and means under the control of the operator for operating said clutch mechanism.

120. In a sewing machine of the class described, the combination of means for automatically conveying the work into position to be sewed, a sewing machine head supported for traveling movement across the path of travel of the conveying means, means for automatically feeding the head across the path of travel of such conveying means, means for automatically returning the head to its initial position, stitching mechanism carried by said head, a track for supporting said head, driving mechanism for the stitching mechanism, clutch mechanism carried by the head for making and breaking connection between the driving mechanism and the stitching mechanism, and means located on the track and effective to automatically disengage the driving mechanism from the stitching mechanism at a predetermined period.

121. In a sewing machine of the class described, the combination of means for automatically conveying the work into position to be sewed, a sewing machine head supported for traveling movement across the path of travel of the conveying means, means for automatically feeding the head across the path of travel of such conveying means, means for automatically returning the head to its initial position, stitching mechanism carried by said head, a track for supporting said head, driving mechanism for the stitching mechanism, clutch mechanism carried by the head for making and breaking connection between the driving mechanism and the stitching mechanism, means located on the track and effective to automatically disengage the driving mechanism from the stitching mechanism at a predetermined period, and means under the control of the operator for also operating the clutch mechanism.

122. In a sewing machine of the class described, the combination of work supporting means, a sewing machine head supported for traveling movement across the work, means for automatically feeding the head across the work, means for automatically returning the head to its initial position, stitching mechanism carried by said head and including gripping means effective to grip the work away from an opening therein and simultaneously raise and thereby infold the work, and means for operating said gripping means.

123. In a sewing machine of the class described, the combination of work supporting means, a sewing machine head supported for traveling movement across the work, means for automatically feeding the head across the work, means for automatically returning the head to its initial position, stitching mechanism carried by said head and including gripping means effective to grip the work away from an opening therein and simultaneously raise and thereby infold and close the opening for the stitching thereof and comprising two pairs of movable fingers, and means for operating said gripping means.

124. In a sewing machine of the class described, the combination of work supporting means, a sewing machine head supported for traveling movement across the work, means for automatically feeding the head across the work, means for automatically returning the head to its initial position, stitching mechanism caried by said head and including gripping means effective to grip the work away from an opening therein and simultaneously raise and thereby infold the work, said gripping means comprising two pairs of pivotally connected and swinging fingers, and means for operating said gripping means.

125. In a sewing machine of the class described, the combination of work supporting means, a sewing machine head supported for traveling movement across the work, means for automatically feeding the head across the work, means for automatically returning the head to its initial position, stitching mechanism carried by said head and including gripping means effective to grip the work away from an opening therein and simultaneously raise and thereby infold the work, said gripping means comprising two pairs of pivotally connected and swinging fingers, one finger of each pair being spring controlled and the other positively actuated, and means for operating said gripping means.

126. In a sewing machine of the class described, the combination of work supporting means, a sewing machine head supported for traveling movement across the work, means for automatically feeding the head across the work, means for automatically returning the head to its initial position, stitching mechanism carried by said head and including gripping means effective to grip the work away from an opening therein and simultaneously raise and thereby infold the work, and also including looper mechanism having a swinging and vertically movable looper having an oscillatory movement in a horizontal plane, means for operating said looper mechanism, and means for operating said gripping means.

127. In a sewing machine of the class described, the combination of work supporting means, a sewing machine head supported for traveling movement across the work, means for automatically feeding the head across the work, means for automatically returning the head to its initial position, stitching mechanism carried by said head and including gripping means effective to grip the work away from an opening therein and simultaneously raise and thereby infold the work, means for operating said gripping means, and also including looper mechanism having a swinging and vertically movable looper having an oscillatory movement in a horizontal plane and means for operating said looper mechanism, and also including a horizontally movable needle and a chain forming finger, and means for operating said needle.

128. In a sewing machine of the class described, the combination of work supporting means, a sewing machine head supported for traveling movement across the work, means for automatically feeding the head across the work, means for automatically returning the head to its initial position, stitching mechanism carried by said head and including looper mechanism provided with a looper having a swinging movement, an up and down movement and an oscillatory movement in a horizontal plane.

129. In a sewing machine of the class described, the combination of work supporting means, a sewing machine head supported for movement across the work, means for advancing the head automatically across the work, means for automatically returning the head, stitching mechanism carried by said head and including looper mechanism having a looper provided with a forked end having prongs projecting in opposite directions, and means for swinging said looper, raising and lowering it and oscillating it in a horizontal plane.

130. In a sewing machine of the class described, the combination of work supporting means, a sewing machine head supported for movement across the work, means for advancing the head automatically across the work, means for automatically returning the head, stitching mechanism carried by said head and including looper mechanism having a looper provided with a forked end having prongs projecting in opposite directions, means for swinging said looper, raising and lowering it and oscillating it in a horizontal plane, a horizontally supported needle, a chain forming mechanism, gripping mechanism effective to grip the work away from an opening therein, raise it to the needle and thereby simultaneously infold the edges thereof and close the opening for the penetration of the needle, and means for operating said needle and gripping mechanism.

131. In a sewing machine of the class described, the combination of work supporting means, a sewing machine head supported for traveling movement across the work, means for automatically feeding the head step by step across the work, means for automatically returning the head to its initial position, stitching mechanism carried by the head, a driving shaft carried by and movable with the head, clutch mechanism intermediate the driving shaft and the stitching mechanism, means under the control of the operator for controlling said clutch mechanism, and a hand wheel carried by the clutch mechanism and by means of which the stitching mechanism may be operated.

132. In a sewing machine of the class described, the combination of work supporting means, a sewing machine head supported for traveling movement across the work, means for automatically feeding the head step by step across the work, means for automatically returning the head to its initial position, stitching mechanism carried by the head, a driving shaft carried by and movable with the head, clutch mechanism intermediate the driving shaft and the stitching mechanism, means under the control of the operator for controlling said clutch mechanism, and a hand wheel carried by the clutch mechanism and by means of which the stitching mechanism may be operated, said stitching mechanism including gripping mechanism, looper mechanism, a needle and a chain forming finger.

133. In a sewing machine of the class described, the combination of work supporting means, a sewing machine head supported for traveling movement across the work, a track or tracks for supporting said head, means for automatically feeding the head across the work, means for automatically returning the head to its initial position, stitching mechanism carried by the head, driving means for the stitching mechanism, clutch mechanism for connecting the driving means with the stitching mechanism, and frictionally operated means in engagement with a track for controlling said clutch mechanism.

134. In a sewing machine of the class described, the combination of work supporting means, a sewing machine head supported for traveling movement across the work, a track or tracks for supporting said head, means for automatically feeding the head across the work, means for automatically returning the head to its initial position, stitching mechanism carried by the head, driving means for the stitching mechanism, clutch mechanism for connecting the driving means with the stitching mechanism, frictionally operated means in engagement with a track for controlling said clutch mechanism, and manually controlled means for operating said frictionally operated means.

135. In a sewing machine of the class described, the combination of work supporting means, a sewing machine head supported for traveling movement across the work, a track or tracks for supporting said head, means for automatically feeding the head across the work, means for automatically returning the head to its initial position, stitching mechanism carried by the head, driving means for the stitching mechanism, clutch mechanism for connecting the driving means with the stitching mechanism, frictionally operative means in engagement with a track for controlling said clutch mechanism, and pedally controlled means for operating said frictionally operative means.

136. In a sewing machine of the class described, the combination of work supporting means, a sewing machine head supported for traveling movement across the work, a track or tracks for supporting said head, means for automatically feeding the head across the work, means for automatically returning the head to its initial position, stitching mechanism carried by the head, driving means for the stitching mechanism, clutch mechanism for connecting the driving means with the stitching mechanism, frictionally operative means in engagement with a track for controlling said clutch mechanism, and manually and pedally operated means for controlling said frictionally operative means.

137. In a sewing machine of the class described, the combination of work supporting means, a sewing machine head supported for traveling movement across the work, a track or tracks for supporting said head, means for automatically feeding the head across the work, means for automatically returning the head to its initial position, stitching mechanism carried by the head, driving means for the stitching mechanism, clutch mechanism for connecting the driving means with the stitching mechanism, frictionally operative means in engagement with a track for controlling said clutch mechanism and comprising spring tensioned rolls, means for imparting a tension thereto, and a clutch shifter connected therewith.

138. In a sewing machine of the class described, the combination of a traveling belt, a driving drum for supporting it, the circumference of the drum being equal to the longest article to be conveyed, a sewing machine head supported for traveling movement across the path of travel of the belt and carrying stitching mechanism, means for automatically feeding the head across the path of travel of the belt, means for automatically returning the head to its initial position, and means for automatically operating the belt during the return of the head to its initial position.

139. In a sewing machine of the class described, the combination of work supporting means, a traveling head carrying stitching mechanism, means for automatically feeding the head across the work, means for automatically returning the head to its initial position, and a swinging cover carried at the forward end of the head for protecting the stitching mechanism.

JOHN P. WEIS.

Witnesses:
 Ed. L. Russell,
 Hugo Rentzler.

---

Copies of this patent may be obtained for five cents each, by addressing the "Commissioner of Patents, Washington, D. C."